US012750925B2

(12) United States Patent
Lee et al.

(10) Patent No.: US 12,750,925 B2
(45) Date of Patent: Sep. 29, 2026

(54) HEATING COOKING APPARATUS AND METHOD FOR CONTROLLING THE SAME

(71) Applicant: SAMSUNG ELECTRONICS CO., LTD., Suwon-si (KR)

(72) Inventors: Yunkyeong Lee, Suwon-si (KR); Sanga Kim, Suwon-si (KR); Jaewoong Kim, Suwon-si (KR); Juneok Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 644 days.

(21) Appl. No.: 18/217,184

(22) Filed: Jun. 30, 2023

(65) Prior Publication Data

US 2023/0345587 A1 Oct. 26, 2023

Related U.S. Application Data

(63) Continuation of application No. PCT/KR2022/002910, filed on Mar. 2, 2022.

(30) Foreign Application Priority Data

Mar. 17, 2021 (KR) ........................ 10-2021-0034939

(51) Int. Cl.
*H05B 6/06* (2006.01)
*H05B 6/12* (2006.01)

(52) U.S. Cl.
CPC ........... *H05B 6/062* (2013.01); *H05B 6/1209* (2013.01); *H05B 2213/07* (2013.01)

(58) Field of Classification Search
None
See application file for complete search history.

(56) References Cited

U.S. PATENT DOCUMENTS 8,419,434 B2 4/2013 Do et al.
10,395,553 B2 8/2019 Aso et al.
(Continued)

FOREIGN PATENT DOCUMENTS

CN 107065607 A * 8/2017 .............. F24C 3/126
CN 111722542 A * 9/2020 ............. G05B 19/04
(Continued)

OTHER PUBLICATIONS

Communication issued Jun. 9, 2025 by the Korean Intellectual Property Office in Korean Patent Application No. 10-2021-0034939.
(Continued)

*Primary Examiner* — John J Norton
(74) *Attorney, Agent, or Firm* — Sughrue Mion, PLLC

(57) ABSTRACT

A heating cooking apparatus includes: a plate; a heater configured to heat a cooking container placed in a cooking area of the plate; and a controller configured to create a recipe including a plurality of stages based on operation information of the heater, wherein the controller is configured to, based on a change in operation state of the heater, create a first stage based on first operation information, among the operation information of the heater, which corresponds to the operation state of the heater before the change of the operation state of the heater, and create a second stage based on second operation information, among the operation information of the heater, which corresponds to the operation state of the heater after the change of the operation state of the heater, and the recipe includes the first stage and the second stage.

20 Claims, 22 Drawing Sheets

(56) References Cited

U.S. PATENT DOCUMENTS

| | | | |
|---|---|---|---|
| 10,671,410 B1 | 6/2020 | Sutton et al. | |
| 11,102,851 B2 | 8/2021 | Li et al. | |
| 2020/0106636 A1 | 4/2020 | Xie et al. | |
| 2021/0235554 A1 | 7/2021 | Jeong et al. | |
| 2021/0338008 A1* | 11/2021 | Ohtani | A23L 5/00 |

FOREIGN PATENT DOCUMENTS

| | | | | |
|---|---|---|---|---|
| JP | 2002-98338 A | | 4/2002 | |
| JP | 2004-220414 A | | 8/2004 | |
| JP | 2007-107766 A | | 4/2007 | |
| JP | 4693494 B2 | | 6/2011 | |
| JP | 2013-185780 A | | 9/2013 | |
| JP | 6265868 B2 | | 1/2018 | |
| JP | 2019-82304 A | | 5/2019 | |
| JP | 2020041772 A | * | 3/2020 | |
| JP | 2021-34223 A | | 3/2021 | |
| JP | 2021-166136 A | | 10/2021 | |
| KR | 2001-0055702 A | | 7/2001 | |
| KR | 10-1457087 B1 | | 10/2014 | |
| KR | 10-1559980 B1 | | 10/2015 | |
| KR | 10-1895509 B1 | | 9/2018 | |
| KR | 10-2018-0115769 A | | 10/2018 | |
| KR | 10-1970662 B1 | | 4/2019 | |
| KR | 10-1981330 B1 | | 5/2019 | |
| KR | 10-2019-0100526 A | | 8/2019 | |
| KR | 10-2019-0112981 A | | 10/2019 | |
| KR | 10-2020-0053167 A | | 5/2020 | |
| KR | 10-2131357 B1 | | 7/2020 | |
| KR | 10-2189589 B1 | | 12/2020 | |
| KR | 10-2021-0095424 A | | 8/2021 | |
| WO | WO-2019097375 A1 | * | 5/2019 | F24C 3/126 |
| WO | WO-2020109330 A1 | * | 6/2020 | A47J 36/32 |

OTHER PUBLICATIONS

International Search Report dated Jun. 17, 2022, issued by the International Searching Authority in counterpart International Application No. PCT/KR2022/002910 (PCT/ISA/210).

Written Opinion dated Jun. 17, 2022, issued by the International Searching Authority in counterpart International Application No. PCT/KR2022/002910 (PCT/ISA/237).

* cited by examiner

HEATING COOKING APPARATUS AND METHOD FOR CONTROLLING THE SAME

CROSS-REFERENCE TO RELATED APPLICATIONS

This application is a by-pass continuation application of International Application No. PCT/KR2022/002910, filed on Mar. 2, 2022, which claims priority to Korean Patent Application No. 10-2021-0034939, filed on Mar. 17, 2021, in the Korean Intellectual Property Office, the disclosures of which are incorporated by reference herein their entireties.

BACKGROUND

1. Field

The disclosure relates to a heating cooking apparatus and method for controlling the same, which heats a cooking container by using magnetic induction.

2. Description of Related Art

An induction cooker, which uses magnetic induction to heat a cooking container, is regarded as better than the existing gas stove in terms of stability and environmental protection.

Some of induction cookers have a function of automatically controlling the heating intensity or have an interface that provides information for the user. In those induction cookers, the heating intensity may be automatically controlled based on a recipe selected by the user or a cooking guide may be provided for the user based on the recipe.

However, controlling the induction cookers based on a set recipe may not reflect different tastes of different users, so those induction cookers may have a limitation in user satisfaction.

SUMMARY

Provided are a heating cooking apparatus and a method for controlling the same, which provide a user-customized recipe by automatically creating a new recipe based on operation information of the heating cooking apparatus.

According to an aspect of the disclosure, a heating cooking apparatus includes: a plate; a heater configured to heat a cooking container placed in a cooking area of the plate; and a controller configured to create a recipe including a plurality of stages based on operation information of the heater, wherein the controller is configured to, based on a change in operation state of the heater, create a first stage based on first operation information, among the operation information of the heater, which corresponds to the operation state of the heater before the change of the operation state of the heater, and create a second stage based on second operation information, among the operation information of the heater, which corresponds to the operation state of the heater after the change of the operation state of the heater, and the recipe includes the first stage and the second stage.

The operation state of the heater may include a heating intensity of the heater and a power status of the heater, and the operation information of the heater may include information about the heating intensity of the heater, a heating time of the heater, and the cooking area.

The heating cooking apparatus further including a user interface configured to receive a user input regarding whether to create the recipe or whether to add another stage belonging to the recipe based on the change of the operation state of the heater.

The heating cooking apparatus may further include a user interface configured to receive a user input regarding a start of creation of the recipe and a termination of creation of the recipe, and the controller may be further configured to automatically create the first stage and the second stage based on the operation information of the heater between the start of creation of the recipe and the termination of creation of the recipe.

The cooking area may include a plurality of cooking zones, and the heater may include a plurality of coils corresponding to the plurality of cooking zones, respectively.

The heating cooking apparatus may further include a user interface configured to receive a user input to select a cooking zone of the plurality of cooking zones, the cooking zone being related to the creation of the recipe based on at least two of the plurality of cooking zones being used in creating the recipe.

The controller may be further configured to create the recipe based on operation information of a coil in the plurality of coils, the coil being corresponding to the selected cooking zone.

The heating cooking apparatus may further include a user interface configured to receive a user input to select the created recipe, and the controller may be further configured to control the operation state of the heater based on the selected recipe.

The user interface may be further configured to receive a user input to select a cooking zone, among the plurality of cooking zones, to be operated based on the selected recipe, and the controller may be further configured to control an operation state of a coil corresponding to the selected cooking zone.

The heating cooking apparatus may further include a user interface configured to output a notification of a change between the first stage and the second stage.

According to an aspect of the disclosure, a method of controlling a heating cooking apparatus including a plate and a heater for heating a cooking container placed in a cooking area of the plate, includes: based on a change of an operation state of the heater, creating a first stage based on first operation information of the heater, which corresponds to the operation state of the heater before the change of the operation state of the heater; creating a second stage based on second operation information of the heater, which corresponds to the operation state of the heater after the change of the operation state of the heater; and creating a recipe including the first stage and the second stage.

The operation state of the heater may include a heating intensity of the heater and a power status of the heater, and the first and second operation information of the heater may include information about the heating intensity of the heater, a heating time of the heater, and the cooking area.

The method may further include, based on the change of the operation state of the heater, receiving a user input regarding at least one of whether to start creating the recipe, whether to add another stage to the recipe, and whether to terminate creating the recipe.

The method may further include: receiving a user input regarding a start of creation of the recipe and a termination of creation of the recipe, and creating the first stage and the second stage automatically based on the operation information of the heater between the start of creation of the recipe and the termination of creation of the recipe.

The cooking area may include a plurality of cooking zones, and the heater may include a plurality of coils corresponding to the plurality of cooking zones, respectively.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
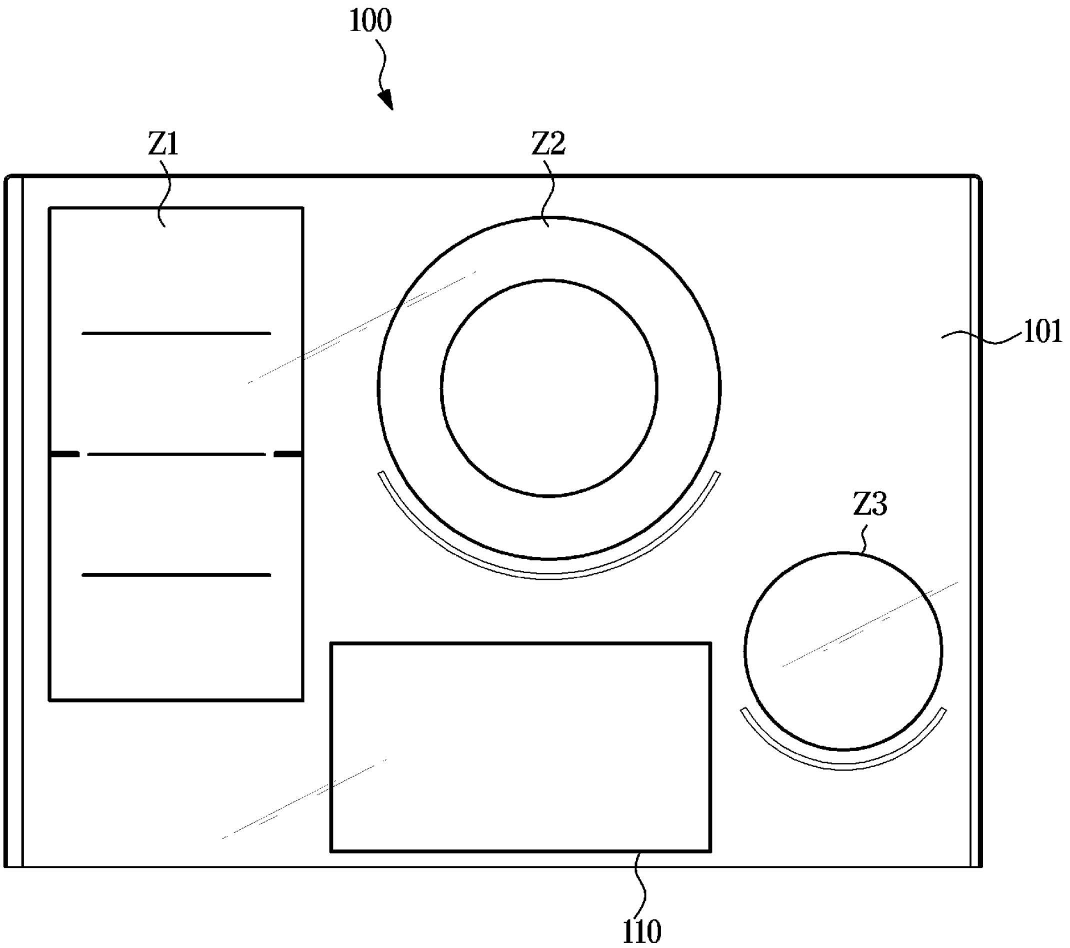
FIG. 1 is an exterior diagram of a heating cooking apparatus viewed from above, according to an embodiment.

Like numerals refer to like elements throughout the specification. Not all elements of embodiments of the disclosure will be described, and description of what are commonly known in the art or what overlap each other in the embodiments will be omitted. The term 'unit, module, member, or block' may refer to what is implemented in software or hardware, and a plurality of units, modules, members, or blocks may be integrated in one component or the unit, module, member, or block may include a plurality of components, depending on the embodiment of the disclosure.

It will be further understood that the term "connect" or its derivatives refer both to direct and indirect connection, and the indirect connection includes a connection over a wireless communication network or an electric connection through electric wires.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

Throughout the specification, when a component is mentioned to send or transmit a signal to another component, it does not exclude a possibility of an intermediate component that exists between the two components, through which to send or transmit the signal, unless otherwise mentioned.

Throughout the specification, ordinal numbers used before components are used to distinguish the components from one another, and do not imply order of arrangement, manufacturing, or importance.

It is to be understood that the singular forms "a," "an," and "the" include plural references unless the context clearly dictates otherwise.

Reference numerals used to denote method steps are just used for convenience of explanation, but not to limit an order of the steps. Thus, unless the context clearly dictates otherwise, the written order may be practiced otherwise.

Embodiments of a heating cooking apparatus and method for controlling the same will now be described in detail with reference to accompanying drawings.

Figure 2:
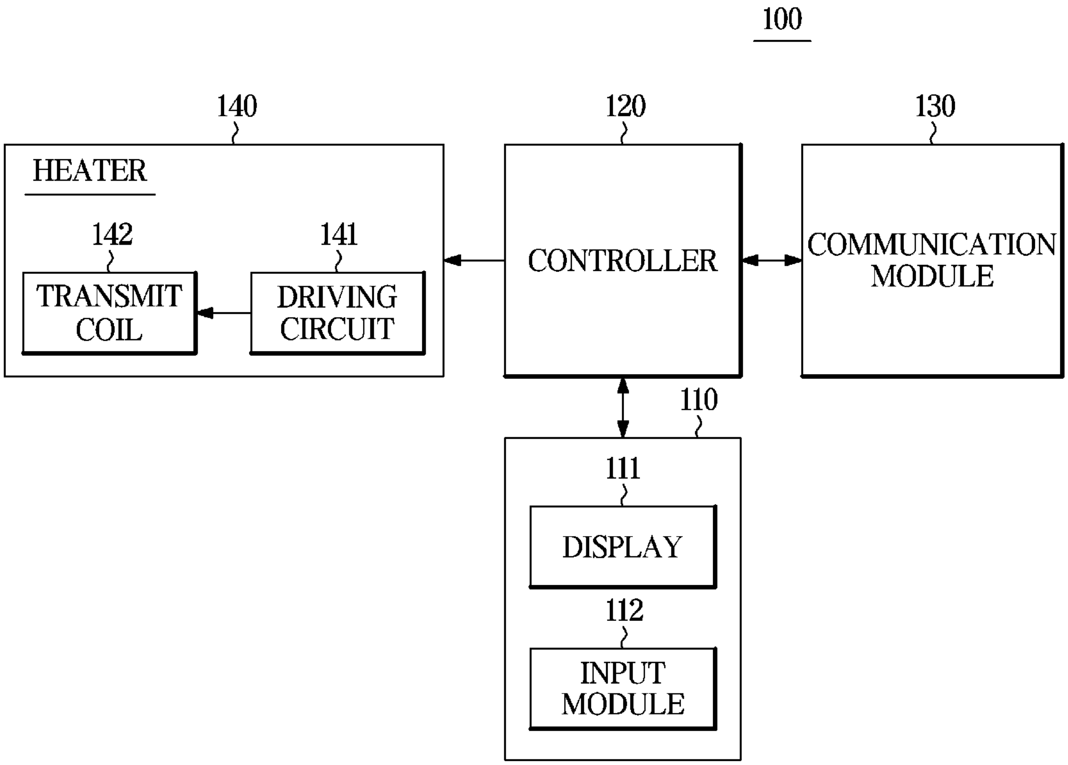
FIG. 2 is a control block diagram of a heating cooking apparatus, according to an embodiment.

FIG. 1 is an exterior diagram of a heating cooking apparatus viewed from above, according to an embodiment, and FIG. 2 is a control block diagram of a heating cooking apparatus, according to an embodiment.

Referring to FIG. 1, a heating cooking apparatus 100 in an embodiment includes a plate 101 arranged on top, at least one cooking area (zone) Z (cooking zones Z1, Z2 and Z3) formed on the plate 101 and a user interface 110 serving as an input/output device.

Also referring to FIG. 2, the heating cooking apparatus 100 according to an embodiment further includes a heater 140 for heating a cooking container placed in the cooking zone Z, a controller 120 for creating a recipe including a plurality of stages based on operation information of the heater 140, and a communication module 130 for communicating with an external device.

In an embodiment, the heating cooking apparatus 100 may heat the cooking container by magnetic induction. Hence, the heater 140 may include a driving circuit 141 and a driving coil 142. When the driving circuit 141 receives power from an external power source, rectifies the power, and transfers the rectified power to the driving coil 142, the driving coil 142 may produce a magnetic field or an electromagnetic field based on a current applied from the driving circuit 141.

In a specific example, the driving circuit 141 may include a rectifying circuit and an inverter circuit. The rectifying circuit may convert alternate current (AC) power to direct current (DC) power. The rectifying circuit may convert an AC voltage with magnitude and polarity (positive voltage or negative voltage) changing in time to a DC voltage with constant magnitude and polarity, and convert an AC current with magnitude and direction (positive current or negative current) changing in time to a DC current with constant magnitude.

The rectifying circuit may include a bridge diode. The rectifying circuit may include 4 diodes. The diodes may form two pairs of diodes, each pair having two diodes connected in series, and the two pairs of diodes may be connected in parallel with each other. The bridge diode may convert an AC voltage with polarity changing in time to a positive voltage with constant polarity, and convert an AC current with directions changing in time to a positive current having a constant direction.

Furthermore, the rectifying circuit may include a DC link capacitor. The DC link capacitor may convert a positive voltage with magnitude changing in time to a DC voltage with constant magnitude. The DC link capacitor may maintain and provide the converted DC voltage to the inverter circuit.

The inverter circuit may have a current flow to the driving coil 142 by switching the voltage applied to the driving coil 142. The inverter circuit may include a switching circuit for applying or blocking the current to the driving coil 142 and a resonant capacitor. The switching circuit may include two switching devices. One end of the driving coil 142 is connected to a connection point of the switching device, and the other end of the driving coil 142 is connected to the resonant capacitor. The switching device may be turned on or off according to a control signal of the controller 120. With the switching operation (on/off) of the switching device, a current and voltage may be applied to the driving coil 142.

Two resonant capacitors may be provided to serve as buffers. The resonant capacitor controls a rate of increase in saturation voltage while the switching device is turned off, affecting the energy loss. Furthermore, the resonant capacitor determines a resonant frequency of the driving coil 142.

The switching device is turned on or off at high speed, and thus may be implemented with a 3-terminal semiconductor switching device having high response speed. For example, the switching device may be a bipolar junction transistor (BJT), a metal-oxide semiconductor field effect transistor (MOSFET), an insulated gate bipolar transistor (IGBT), or a thyristor.

The driving coil 142 produces a magnetic field according to the current applied from the inverter circuit.

The plate 101 made of tempered glass such as ceramic glass is arranged on top of the driving coil 142, and an area corresponding to the driving coil 142, i.e., an area on the plate 101 under which the driving coil 142 is arranged, is the cooking zone Z.

When a cooking container formed of a particular material, e.g., a cooking container formed of a magnetic material, is placed in the cooking zone Z, eddy current may be produced in the cooking container due to the magnetic field formed by the driving coil 142, heating the cooking container.

The number of the driving coils 142 may vary by the number of the cooking zones Z. In embodiments of the heating cooking apparatus 100, there are no limitations on the number of the driving coils 142 and the cooking zones Z, but a case of having 3 cooking zones Z will be taken as an example for specific explanation.

The cooking zones Z1, Z2 and Z3 may have the respective driving coils 142 located thereunder, which may be controlled separately. Accordingly, the respective heating intensity and on/off of the cooking zones Z1, Z2 and Z3 may be separately controlled. In this embodiment, the heating intensity of the cooking zone Z1, Z2 or Z3 refers to an extent to which the heater 140 heats the cooking container placed in the cooking zone Z1, Z2 or Z3, and the on/off of the cooking zone Z1, Z2 or Z3 refers to on/off of the heater 140 arranged underneath the cooking zone Z1, Z2 or Z3. The heating time of the heater 140 may refer to a time from when the heater 140 is turned on until the heating intensity is changed or the heater 140 is turned off.

The cooking zones Z1, Z2 and Z3 may be variously arranged on the plate 101. Furthermore, as shown in FIG. 1, it is also possible to divide at least one cooking zone Z1 into multiple areas and use each area separately or two or more areas as one area. In this case, a plurality of driving coils 142, which may be separately controlled, may be arranged under the cooking zone Z1.

The user interface 110 may be arranged to be spaced apart from the cooking zones Z1, Z2 and Z3 on the plate 101. However, the layout in FIG. 1 is merely an example that may be applied to the heating cooking apparatus 100. Hence, it may also be possible that the user interface 110 is arranged in a position such as on the front surface of the heating cooking apparatus 100 instead of the plate 101.

The user interface 110 may include a display 111 for displaying information regarding an operation of the heating cooking apparatus 100 and an input module 112 for receiving a user input. The display 111 may include a display device such as a liquid crystal display (LCD) or light emitting diodes (LEDs), and the input module 112 of the heating cooking apparatus 100 may include at least one of various input devices such as soft keys, hard keys, a jog shuttle, etc. In the following embodiment, the user interface 110 implemented with a touch screen that performs both functions of the display 111 and the input module 112 of the heating cooking apparatus 100 will be taken as an example for specific explanation.

In an embodiment, the heating cooking apparatus 100 may automatically create a user-customized recipe while the user is cooking with the heating cooking apparatus 100. For this, the heating cooking apparatus 100 may use information about how the user used the heating cooking apparatus 100 (operation information).

As described above, the controller 120 may create a recipe including a plurality of stages based on the operation information of the heater 140. The operation information of the heater 140 may include information about the heating intensity of the heater 140, the heating time of the heater 140 and a position of the cooking zone Z used for cooking. How the recipe is created will be described in more detail later.

The controller 120 may control the operation related to recipe creation, and further, an overall operation of the heating cooking apparatus 100. The heater 140 may be controlled according to a user input received through the user interface 110, the user interface 110 may be controlled to display the information about the operation of the heater 140, the communication module 130 may be controlled to obtain required information from an external device, and the heater 140 or the user interface 110 may be controlled according to information received by the communication module 130.

The controller 120 may include at least one memory for storing a program for carrying out the aforementioned and following operations, and at least one processor for executing the program.

Figure 3:
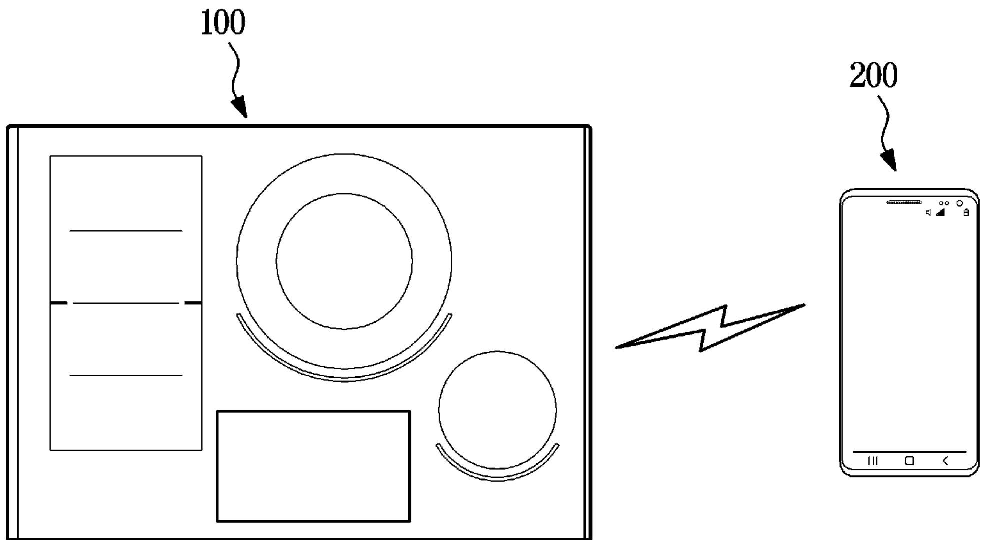
FIG. 3 is an exterior diagram illustrating a mobile device in communication with a heating cooking apparatus, according to an embodiment.
Figure 4:
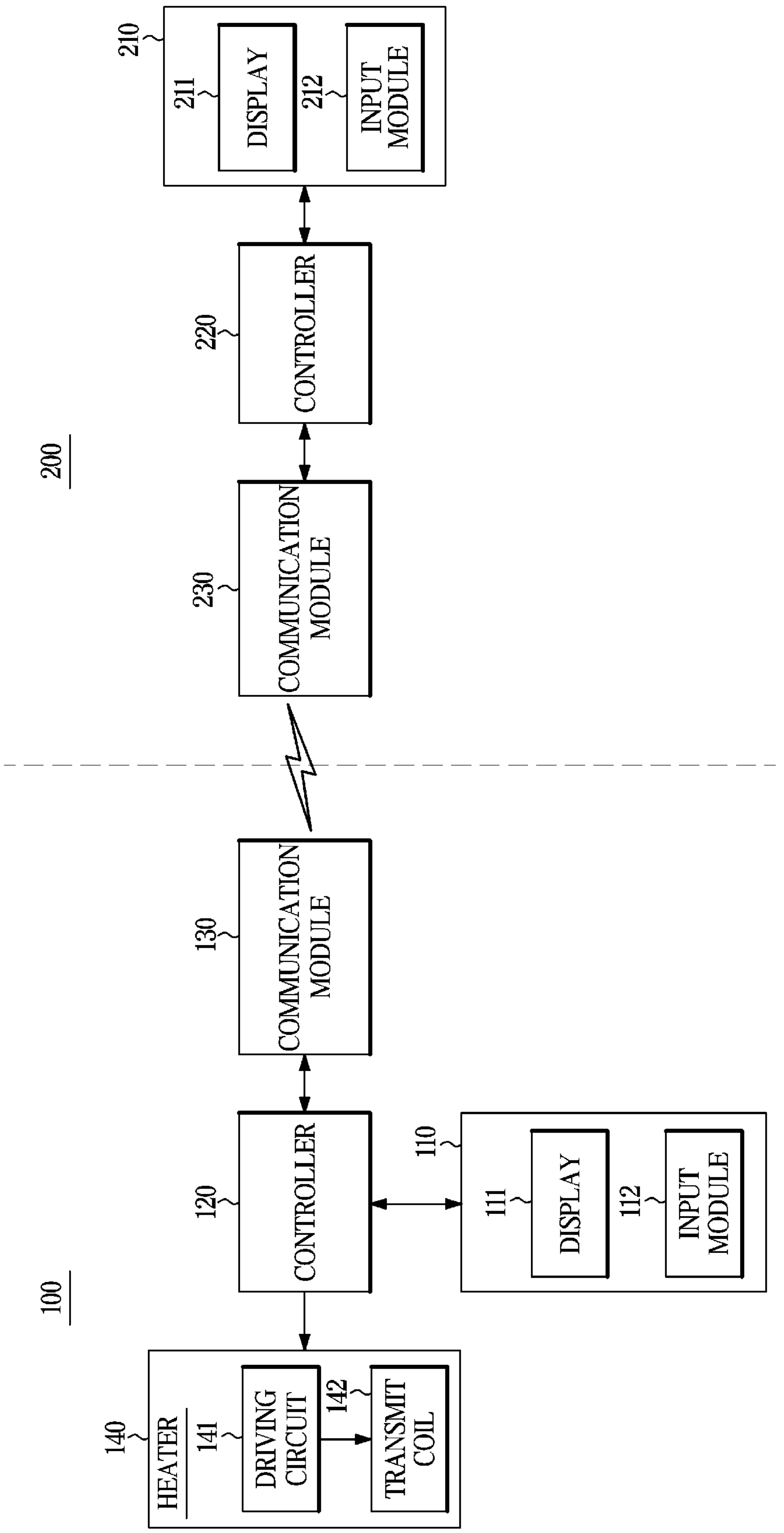
FIG. 4 is a control block diagram of a mobile device in communication with a heating cooking apparatus, according to an embodiment.

FIG. 3 is an exterior diagram illustrating a mobile device in communication with a heating cooking apparatus, according to an embodiment, and FIG. 4 is a control block diagram of a mobile device in communication with a heating cooking apparatus, according to an embodiment.

Referring to FIGS. 3 and 4, in an embodiment, the communication module 130 of the heating cooking apparatus 100 may be connected to a mobile device 200 through wireless communication to exchange required information.

The mobile device 200 may include one of various types of portable electronic devices equipped with a user interface, such as a smart phone, a tablet personal computer (PC), a laptop PC, a wearable device, etc.

The communication module 130 of the heating cooking apparatus 100 and a communication module 230 of the mobile device 200 may use at least one wireless communication scheme such as radio frequency identification (RFID), infrared communication, wireless-fidelity (WI-FI™), BLUETOOTH®, ZIGBEE® or near field communication (NFC™), fourth generation (4G), or fifth generation (5G) to exchange required information with each other.

For example, information about a recipe created by the heating cooking apparatus 100 may be transmitted to the mobile device 200, and the mobile device 200 may store the recipe in a memory equipped in the mobile device 200 or transmit the recipe to an external server through the communication module 230 of the mobile device 200.

Alternatively, the communication module 130 of the heating cooking apparatus 100 may communicate directly with an external server to exchange required information. In this case, the heating cooking apparatus 100 may transmit a newly created recipe directly to the external server or receive a required recipe directly from the external server.

When the user performs cooking with the heating cooking apparatus 100 based on a recipe created by the user, information about each stage belonging to the recipe may be displayed or a notification of a stage change may be output through the user interface 110.

It may also be possible that a user interface 210 equipped in the mobile device 200 performs functions as a user input/output device of the heating cooking apparatus 100. In this case, a command for an operation of the heating cooking apparatus 100 may be input through an input module 212 of the mobile device 200, and a display 211 of the mobile device 200 may display information about an operation of the heating cooking apparatus 100.

Operations of the mobile device 200 may be performed by a controller 220. For this, the controller 220 of the mobile device 200 may include at least one memory for storing a program for carrying out the aforementioned and following operations, and at least one processor for executing the program.

The program may be installed in a manufacturing stage of the mobile device 200 or installed by the user after the mobile device 200 is sold. For example, the user may download the program from an external server that stores the program and install the program in the mobile device 200.

Operations of the heating cooking apparatus 100 creating a new recipe based on the operation information of the heater 140 according to an embodiment will now be described in detail.

Figure 5:
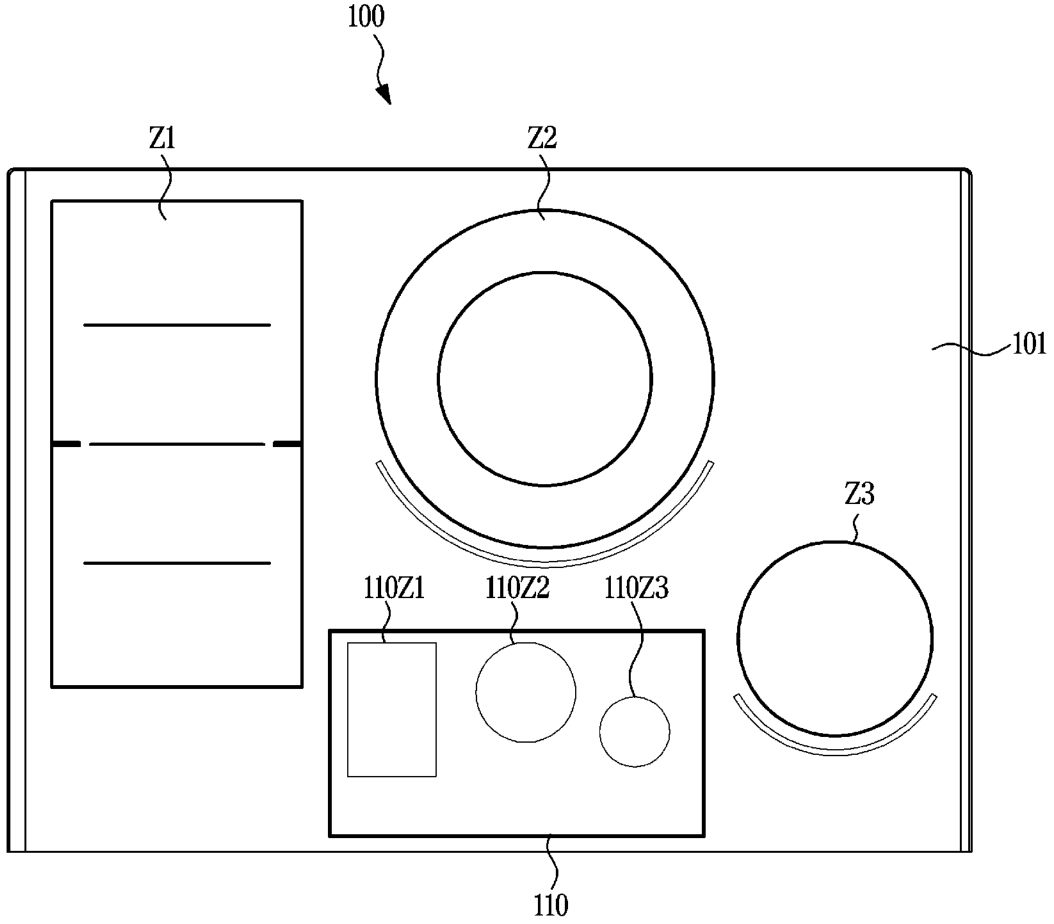
FIG. 5 illustrates an example of a user interface applicable to a heating cooking apparatus, according to an embodiment.
Figure 6:
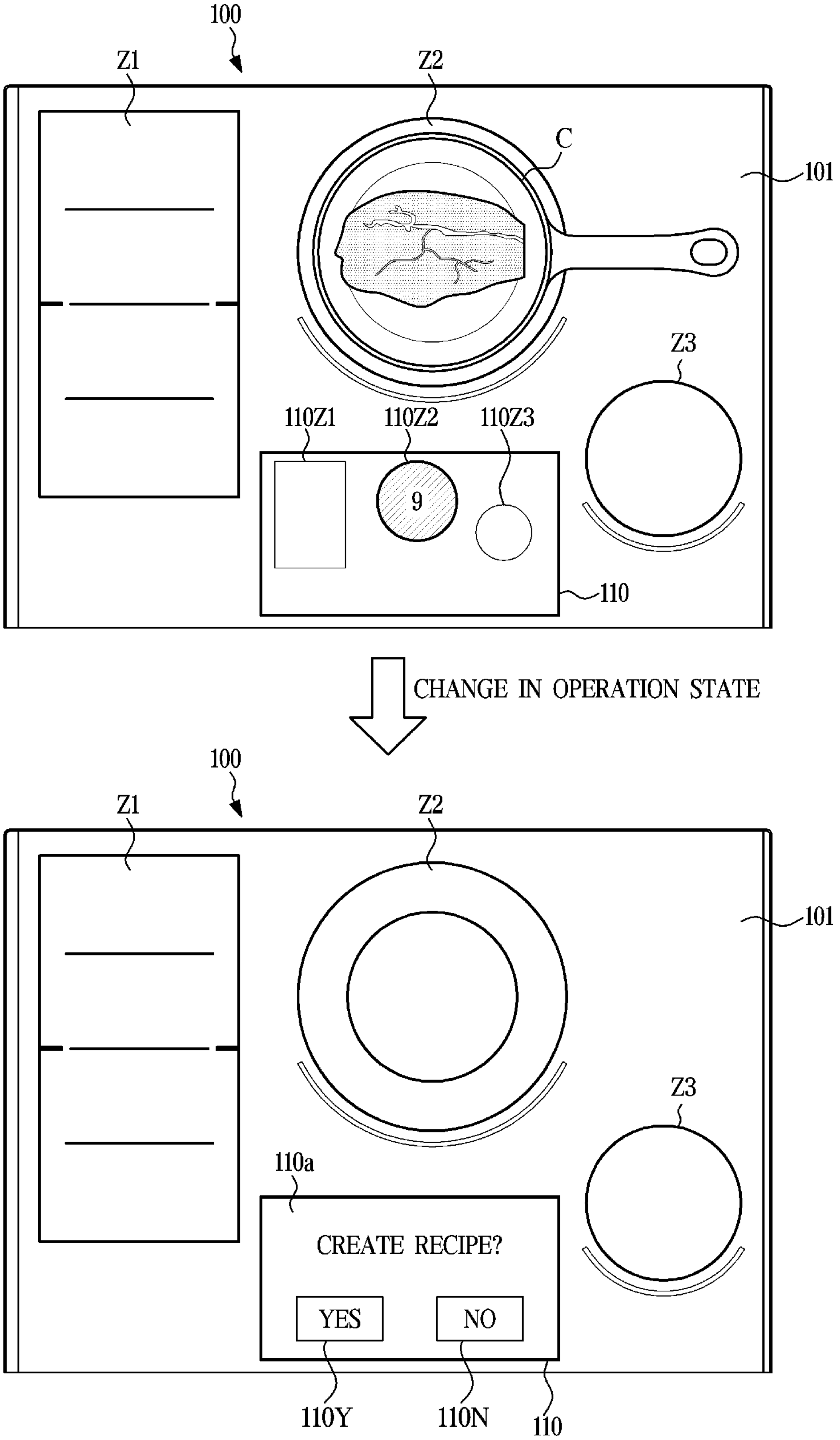
FIGS. 6 to 8 illustrate an example of inputs and outputs exchanged between a heating cooking apparatus and a user to create a recipe, according to an embodiment.
Figure 7:
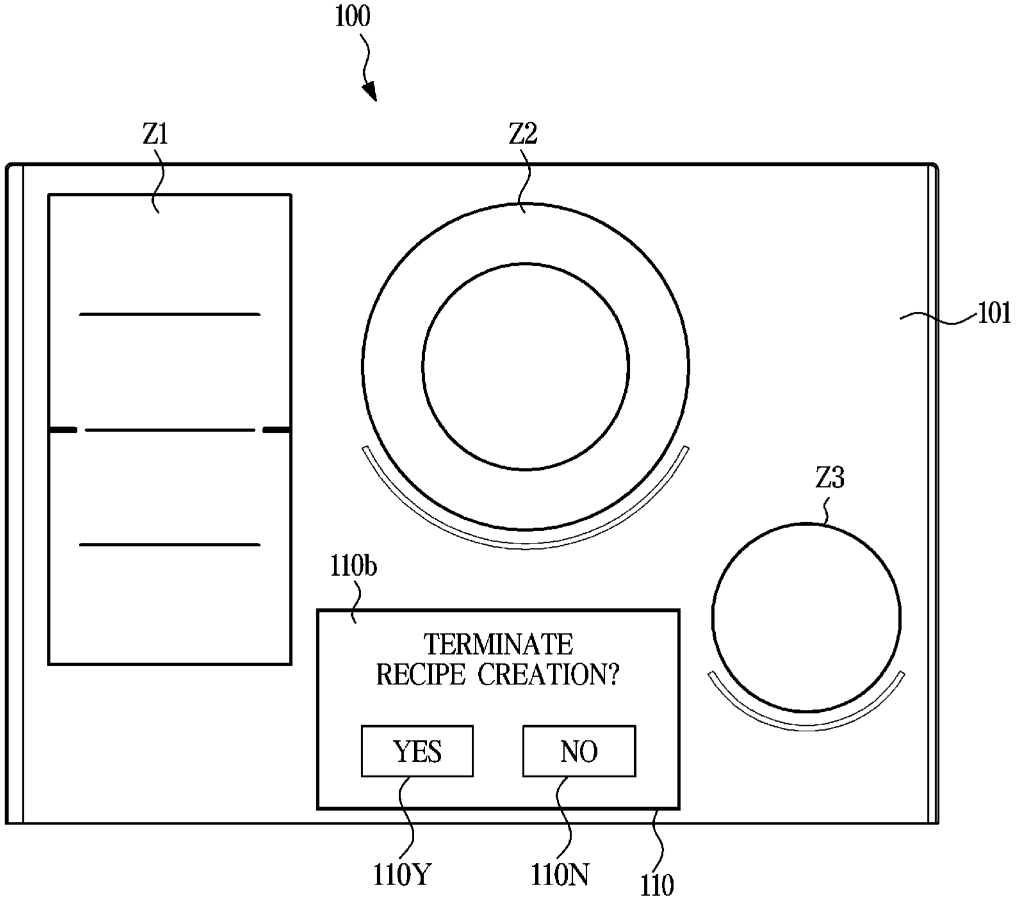
Figure 8:
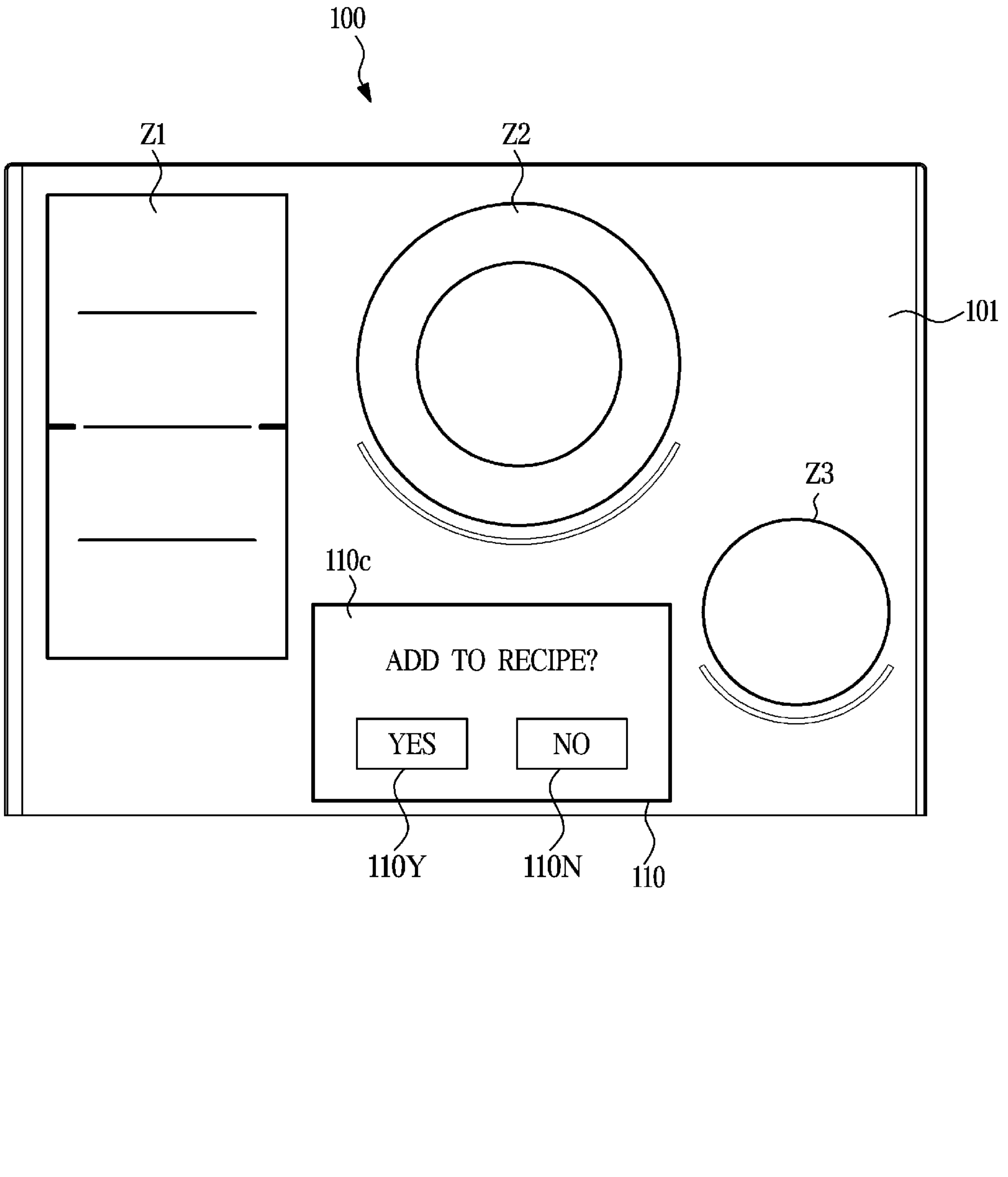

FIG. 5 illustrates an example of a user interface applicable to a heating cooking apparatus, according to an embodiment, and FIGS. 6 to 8 illustrate an example of inputs and outputs exchanged between a heating cooking apparatus and a user to create a recipe, according to an embodiment.

Referring to FIG. 5, the user interface 110 may display icons 110Z1, 110Z2 and 110Z3 corresponding to the respective cooking zones Z1, Z2 and Z3 to control the plurality of cooking zones Z1, Z2 and Z3, separately. The user may select an icon corresponding to a cooking zone Z to be used from among the displayed icons 110Z1, 110Z2 and 110Z3.

When the icon is selected, the user interface 110 may display a graphic user interface (GUI) to control the heating intensity of the cooking zone Z corresponding to the selected icon. For example, the GUI for controlling the heating intensity may be displayed in the form of a slide bar, and the user may drag the slide bar to select a desired heating intensity.

Furthermore, the respective positions of the plurality of cooking zones Z1, Z2 and Z3 may be displayed on the plate 101 to guide placement of a cooking container, and in some embodiments, a display for indicating on/off or heating intensity of the cooking zone may be provided in each of the plurality of cooking zones Z1, Z2 and Z3.

As shown in FIG. 6, an occasion when the user places a cooking container C and performs cooking in the second cooking zone Z2 among the first, second, and third cooking zones Z1, Z2 and Z3 is described as an example. Referring to the user interface 110 of FIG. 6, it is found that heating intensity of the second cooking zone Z2 is set to level 9.

When an operation state of the heater 140 is changed during the cooking, the user interface 110 may display a screen 110*a* to determine whether to create a recipe. In this embodiment, the screen displayed on the user interface 110 implies a set of text, an image, color, etc., simultaneously displayed on the display 111.

The operation state of the heater 140 may include the heating intensity of the heater 140 and on/off of the heater 140, and when at least one of the heating intensity and on/off of the heater 140 is changed, it may be regarded as a change in operation state of the heater 140.

In the illustration of FIG. 6, the cooking container C is removed from the second cooking zone Z2 and the second cooking zone Z2 is turned off. The heating time is assumed to be 30 minutes. The controller 120 may determine that the operation state of the heater 140 is changed, and control the user interface 110 to display the screen 110*a* to determine whether to create a recipe. In this example, the controller 120 automatically determines the removal of the cooking container C and turns off the second cooking zone Z2. The heating cooking apparatus 100 may include an extra sensor for detecting whether the cooking container C is placed or whether the cooking container C is suitable for the heating cooking apparatus 100, or detect this based on a current flowing in the driving coil 142. There is no limitation on how to detect the cooking container C, and any of various technologies known to the public may be used.

It may be obvious to display the screen 110*a* to determine whether to create a recipe even when the user inputs a command to turn off the second cooking zone Z2 through the user interface 110.

When the user selects a yes button 110Y, the controller 120 starts creating a recipe. To create the recipe, the controller 120 may create a stage based on operation information (a position of the cooking zone, heating intensity, and heating time) from before the change in operation state of the heater 140. In the illustration of FIG. 6, an operation of cooking for 30 minutes at a heating intensity of level 9 in the second cooking zone Z2 may be included in a first stage of a plurality of stages belonging to the new recipe.

The controller 120 may further create a next stage based on operation information of the heater 140 from after the change in operation state. The operation information of the heater 140 from after the change in operation state refers to operation information until a next change of the operation state.

For example, when there are two changes in operation state occurring between start and termination of recipe creation, the controller 120 may create the first stage based on operation information between the start of recipe creation and a first change, create a second stage based on operation information between the first change and a second change, and create a third stage based on operation information between the second change and the termination of recipe creation.

In this embodiment, the recipe to be created is assumed to have a plurality of stages, and as in the illustration of FIG. 6, an occasion when the heater is turned off, changing the operation state, and then turned back on is included. In this case, operation information from after a change in operation state caused by turn-off of the heater 140 refers to operation information from after the heater 140 is turned back on. Specifically, the operation information in the turn-off state of the heater 140 may not be reflected in creation of a stage, and the occasion when the heater 140 is changed from the turn-off state to the turn-on state may not be regarded as a change in operation state, which is a basis of stage classification.

The heating cooking apparatus 100 according to an embodiment may create a recipe including a plurality of stages but it does not mean that the heating cooking apparatus 100 needs to always create a recipe including a plurality of stages. Hence, it is obvious that the heating cooking apparatus 100 may create a recipe having a single stage only.

In some cases, the operation information used for stage creation may or may not include a position of the cooking zone. For example, when the position of a cooking zone is meaningful in a cooking procedure, such as when each cooking zone has a different output, information about the position of the cooking zone may be used in creating a stage. In this case, a visual or auditory guide to indicate the position of the cooking zone may be output when cooking is performed based on the created recipe. When the position of the cooking zone to be used is different for each stage, a guide for indicating the position of the cooking zone may be output each time there is a change of stage.

When cooking is safely performed in any cooking zone, the information about the position of the cooking zone may not be used in creating a stage.

Furthermore, when there are both a cooking zone used for cooking related to recipe creation and a cooking zone used for cooking unrelated to recipe creation among the plurality of cooking zones Z1, Z2 and Z3, the controller 120 may create a stage based on a change in operation state of the cooking zone used for cooking related to recipe creation. This will be described later in detail.

When the user selects a no button 110N, the controller 120 does not create a recipe.

When the heater 140 is activated again after a recipe is created and the second cooking zone Z2 is turned off after removal of the cooking container C as shown in FIG. 7, a screen 110*b* for determining whether to stop creating the recipe may be displayed on the user interface 110.

When the user selects the yes button 110Y, creation of the recipe is terminated, and when the no button 110N is selected, creation of the recipe is continued. In any case, a second stage may be created based on operation information from before the second cooking zone Z2 is turned off.

When the creation of the recipe is terminated, the recipe including the first and second stages may be created and stored, and it is also possible to transmit the created recipe to the mobile device 200 or an external server through the communication module 130 as described above.

In the meantime, an occasion when the heating intensity of the cooking zone Z is changed corresponds to a change in operation state of the heater 140. In this case, the controller 120 may automatically create a stage without a user input based on the operation information from before the heating intensity is changed. As a stage is automatically created after a change in heating intensity, the recipe may be conveniently created by minimizing involvement of the user.

For example, when a total of two changes in heating intensity are made after the cooking zone Z is turned on and then the cooking zone Z is turned off, the controller 120 may create a first stage based on operation information from before a first change, create a second stage based on operation information from before a second change after the first change, and create a third stage based on operation information from before the turn-off after the second change. Accordingly, the recipe created by the controller 120 may include the first, second and third stages.

Furthermore, when the cooking zone Z is turned off, and an input to continue to create the recipe is received from the user, a fourth stage may be further created based on the subsequent operation information.

Alternatively, as shown in FIG. 8, a screen 110*c* for determining whether to add the operation from before the change in heating intensity to the recipe may be displayed on the user interface 110. When the user selects the yes button 110Y, the controller 120 may create a stage based on the operation information from before the change in heating intensity.

When the user selects the no button 110N, the controller 120 may create a stage based on operation information from after the change in heating intensity except the operation information from before the change in heating intensity.

As a specific example, when the user changes the heating intensity to level 6 after the second cooking zone Z2 is operated for 10 minutes at a heating intensity of level 8 after the creation of the first stage, the user interface 110 may display the screen 110*c* for determining whether to add the operation to the recipe. When the user selects the yes button 110Y, the controller 120 may create a second stage based on the heating intensity of level 8 and the heating time of 10 minutes.

When the second cooking zone Z2 is turned off after being operated for 5 minutes at a heating intensity of level 6, the controller 120 may create a third stage based on the heating intensity of level 6 and the heating time of 5 minutes.

In the same example, when the user selects the no button 110N, the controller 120 may create the second stage based on the heating intensity of level 6 and the heating time of 15 minutes except for the heating intensity of level 8.

As such, when the user confirms whether to add the operation to the recipe after the change in heating intensity, it may be actually divided into whether step-wise control of the heating intensity is required or whether the existing heating intensity is not appropriate, which may then be reflected in the recipe.

FIGS. 9 to 13 illustrate another example of inputs and outputs exchanged between a heating cooking apparatus and a user to create a recipe, according to an embodiment.

In the previous embodiment, an occasion when the user confirms whether to create or add a recipe each time there is a change in operation state of the heater 140 is taken as an example. In another example, it is also possible that only inputs about the start and termination of recipe creation are received from the user and in-between operations of the heating cooking apparatus 100 are automatically reflected in the recipe without an extra user input.

Figure 9:
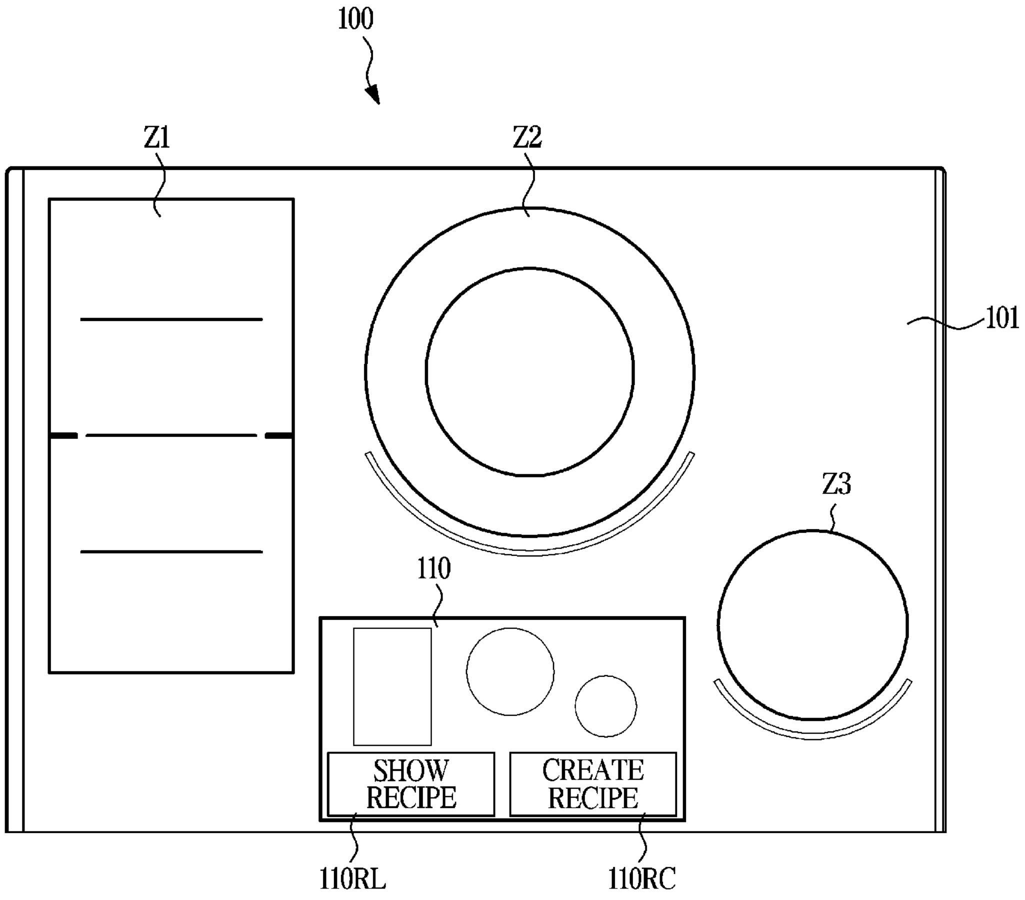
FIGS. 9 and 10 illustrate another example of inputs and outputs exchanged between a heating cooking apparatus and a user to create a recipe, according to an embodiment.

For example, as shown in FIG. 9, a show recipe button 110RL and a create recipe button 110RC may be displayed on the user interface 110. When the show recipe button 110RL is selected, information about an already-created recipe may be provided or the heating cooking apparatus 100 may be automatically controlled according to the selected recipe.

When the create recipe button 110RC is selected, an operation from when the create recipe button 110RC is selected or when the heater 140 is turned on at a closest time to when the create recipe button 110RC is selected may be reflected in the recipe.

When the heater 140 is operated at a certain heating intensity after the create recipe button 110RC is selected and then the operation state is changed, a stage may be automatically created based on operation information from before the change in operation state without receiving confirmation of creation or addition of a recipe from the user, and a next stage may be created based on operation information from after the change.

Figure 10:
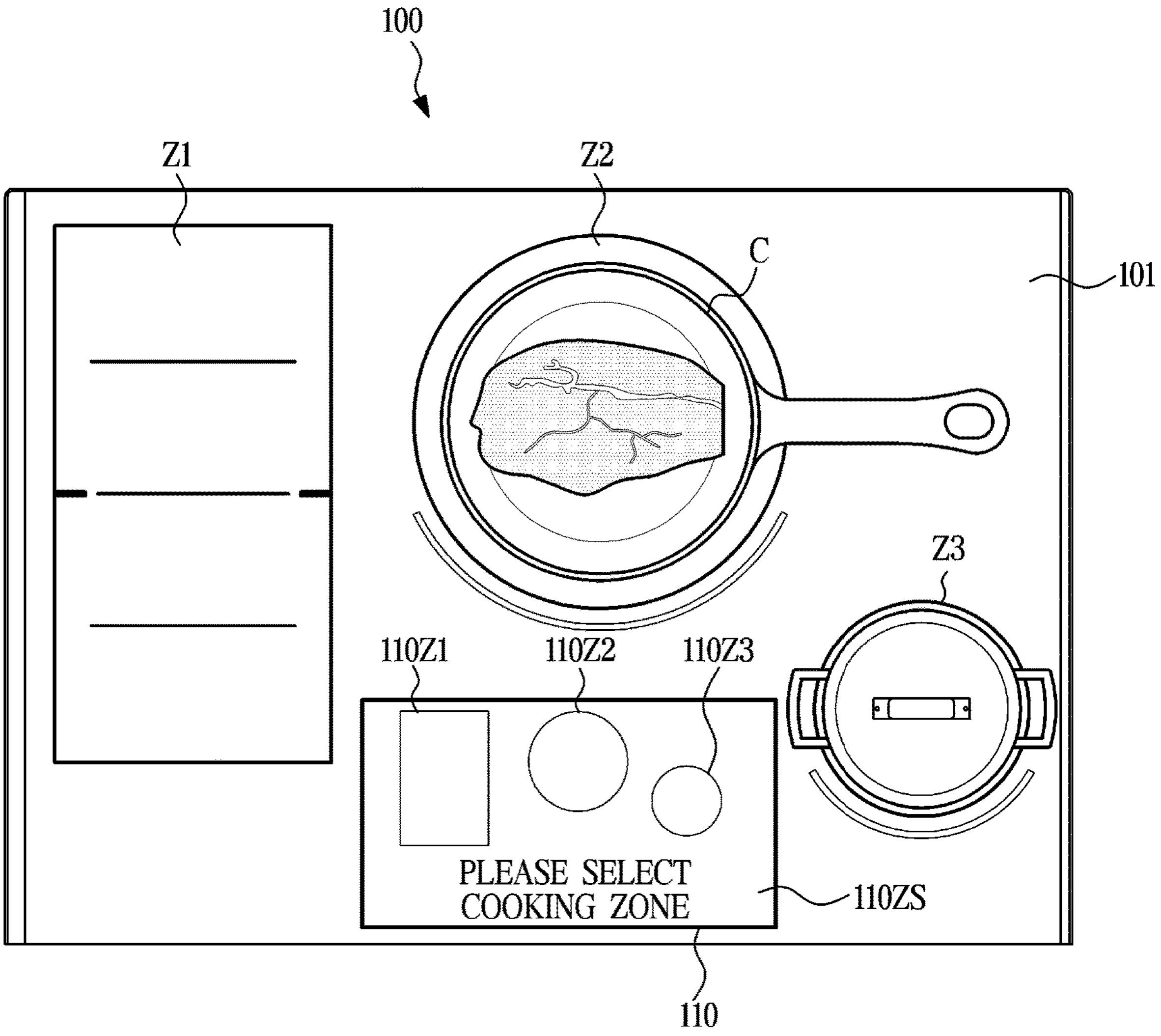

In the meantime, two or more of the plurality of cooking zones Z1, Z2 and Z3 may have sometimes been used while a recipe is created. As shown in FIG. 10, the user interface 110 may receive a user input to select a cooking zone related to recipe creation. For this, a screen 110ZS for guiding selection of a cooking zone may be displayed, and the user may use the screen 110ZS to select a cooking zone to be used for recipe creation.

For example, the screen 110ZS for guiding selection of the cooking zone may include select displayed icons 110Z1, 110Z2 and 110Z3 corresponding to the respective cooking zones Z1, Z2 and Z3, and the user may select a select cooking zone button corresponding to a cooking zone to be used for recipe creation.

In the illustration of FIG. 10, when only the second cooking zone Z2 is used for recipe creation and the third cooking zone Z3 is used for another purpose unrelated to the recipe creation, the user may select only the second cooking zone Z2. In this case, the controller 120 may determine whether to create a stage according to whether the operation state of the second cooking zone Z2 is changed, and create the stage based on operation information of the second cooking zone Z2. The operation state of the third cooking zone Z3 does not affect the recipe creation.

On the other hand, both the second cooking zone Z2 and the third cooking zone Z3 are used for the recipe creation, the user may select both the second cooking zone Z2 and the third cooking zone Z3. In this case, the controller 120 may determine whether to create a stage according to whether the operation states of the second and third cooking zones Z2 and Z3 are changed, and create the stage based on operation information of the second and third cooking zones Z2 and Z3.

Figure 11:
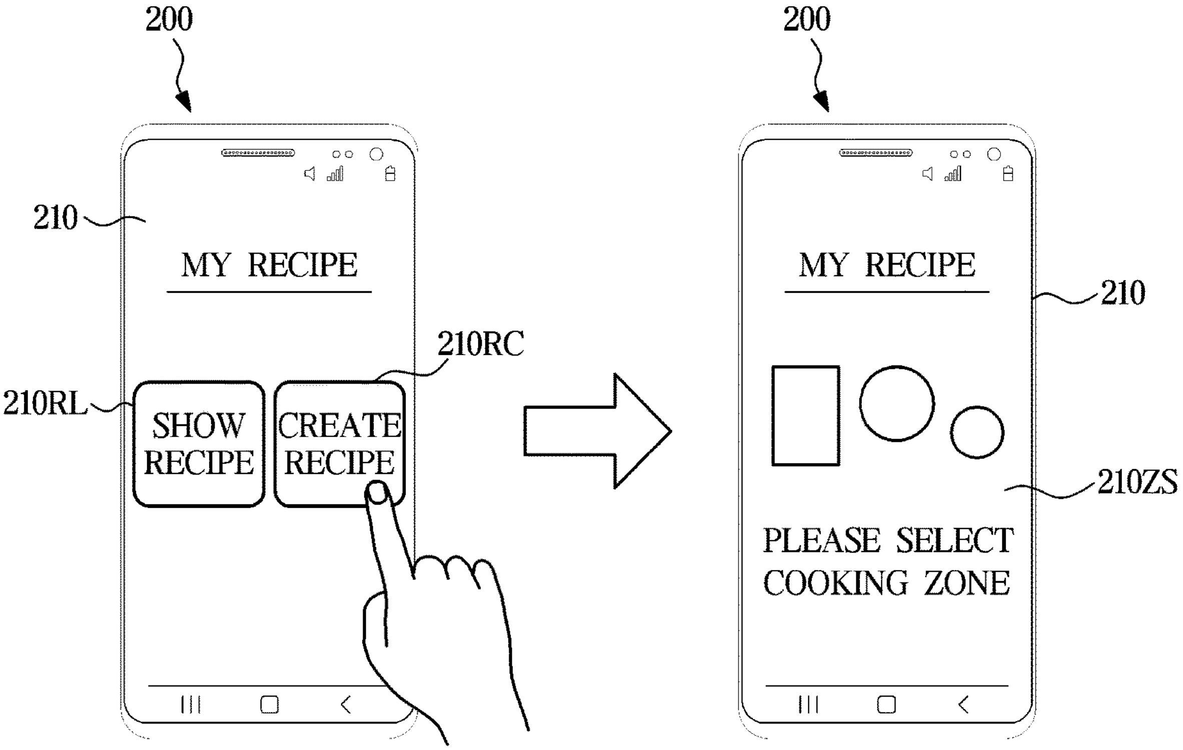
FIG. 11 illustrates an example of an input and an output exchanged between a mobile device and a user to create a recipe.

FIG. 11 illustrates an example of an input and an output exchanged between a mobile device and a user to create a recipe.

It is also possible to perform the aforementioned operations in the mobile device 200 as shown in FIG. 11. When an application for recipe management is executed in the mobile device 200, a show recipe button 210RL and a create recipe button 210RC may be displayed on the user interface 210. When the show recipe button 210RL is selected, information about an already-created recipe may be displayed or the heating cooking apparatus 100 may transmit a signal to automatically control the heating cooking apparatus 100 according to the selected recipe. When the create recipe button 210RC is selected, an operation from when the create recipe button 210RC is selected or when the heater 140 is turned on at a closest time to when the create recipe button 210RC is selected may be reflected in the recipe.

Furthermore, the user interface 210 may receive a user input to select a cooking zone related to recipe creation. For this, a screen 210ZS for guiding selection of a cooking zone may be displayed, and the user may use the screen 210ZS to select a cooking zone to be used for recipe creation.

In the above example, the user input and output is visually implemented. In another example, user inputs and outputs are acoustically implemented.

Figure 12:
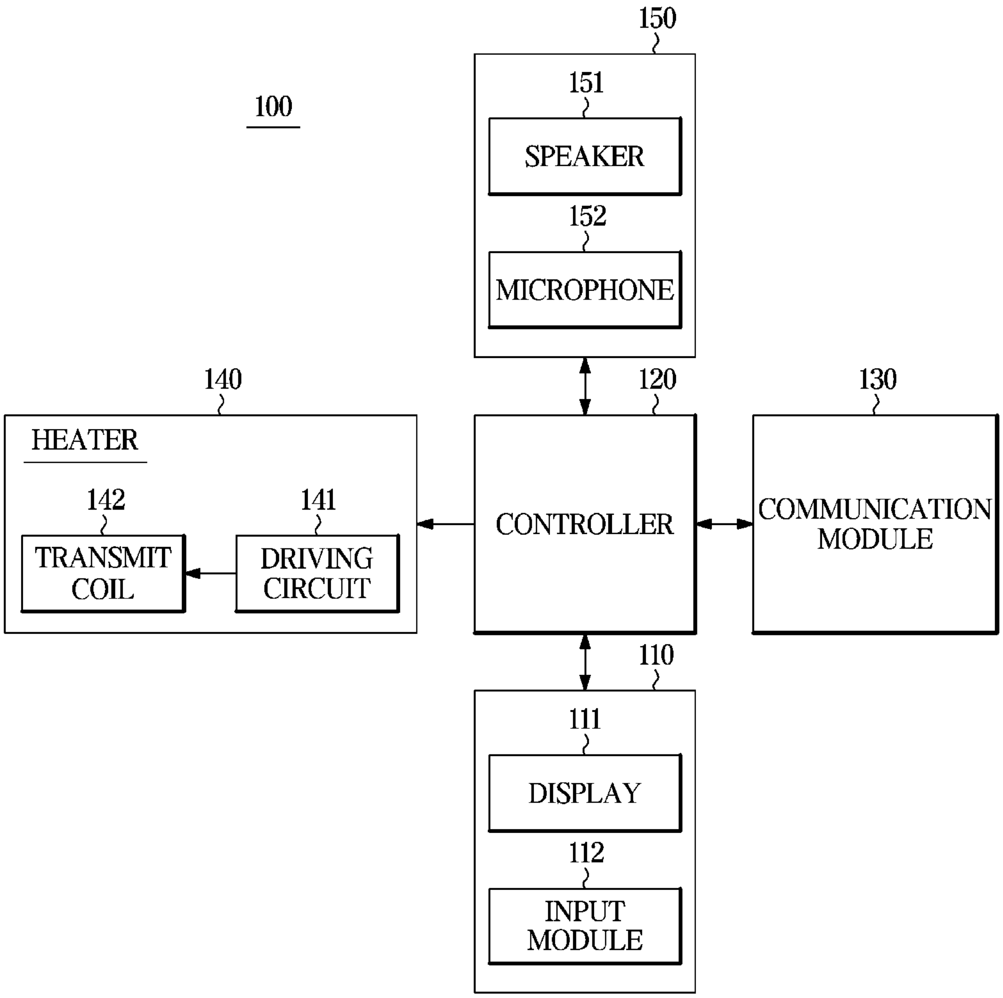
FIG. 12 is a control block diagram of a heating cooking apparatus further including an auditory user interface.
Figure 13:
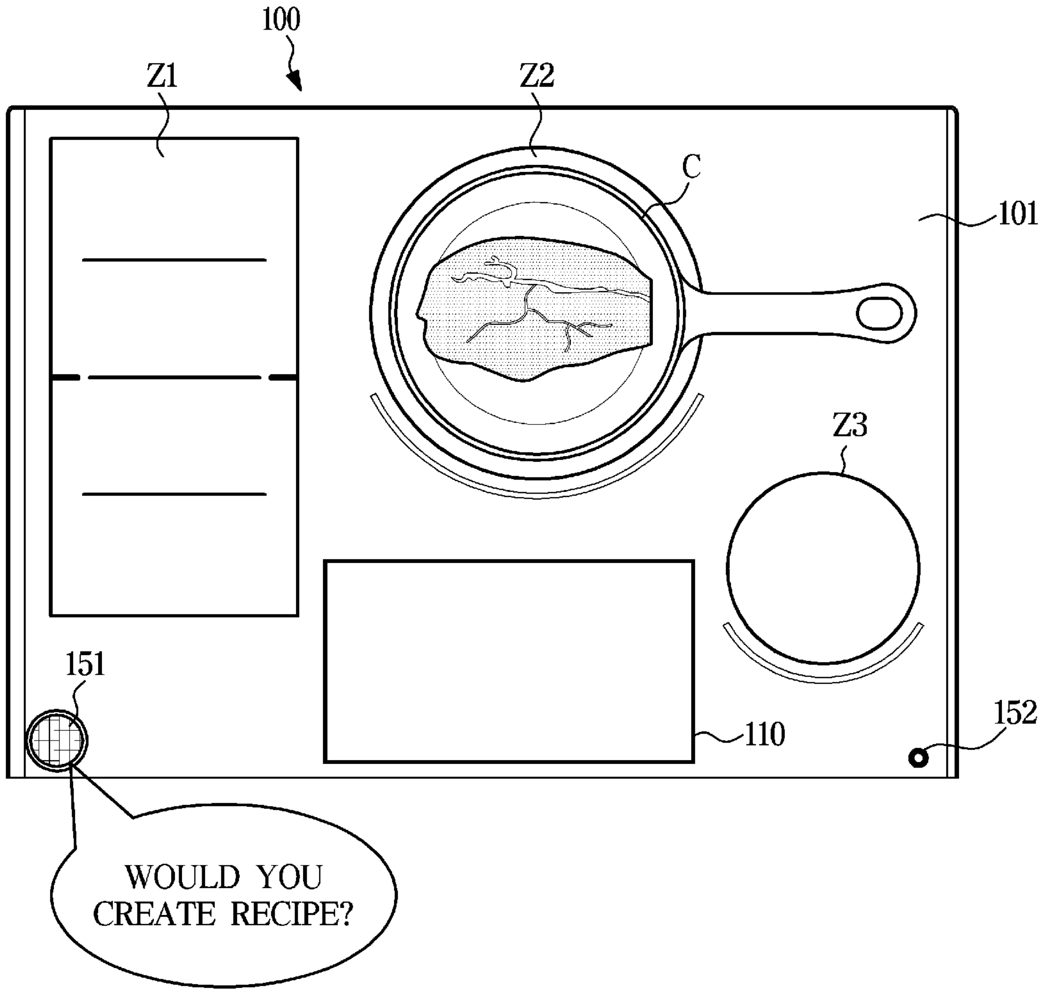
FIGS. 13, 14, and 15 illustrate an example of inputs and outputs audibly exchanged between a heating cooking apparatus and a user, according to an embodiment.
Figure 14:
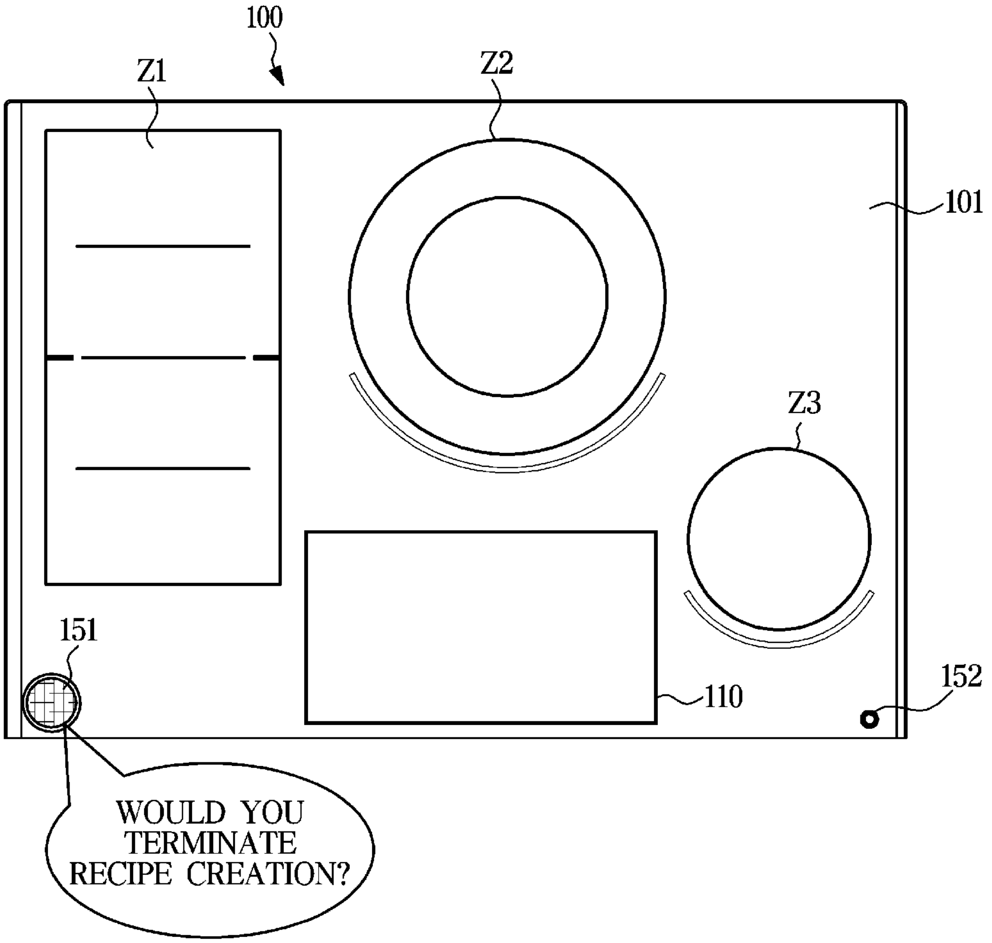
Figure 15:
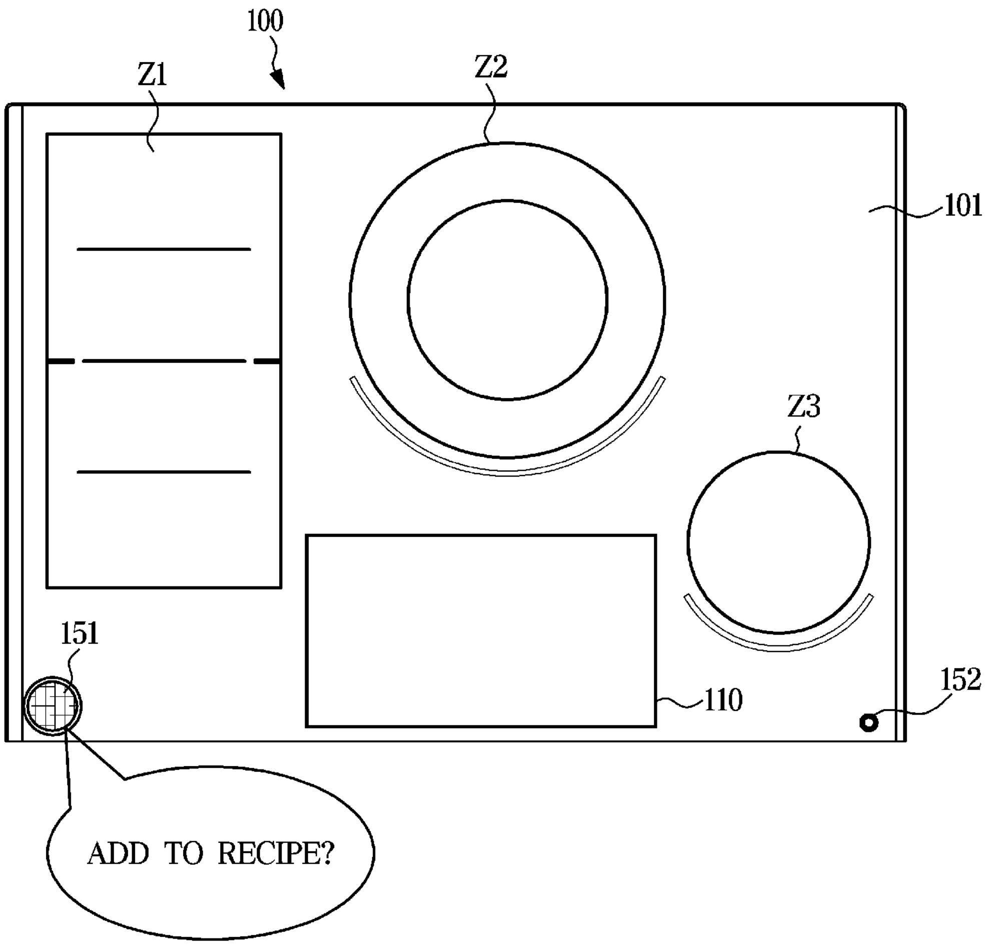

FIG. 12 is a control block diagram of a heating cooking apparatus further including an auditory user interface, and FIGS. 13 to 15 illustrate an example of inputs and outputs audibly exchanged between a heating cooking apparatus and a user, according to an embodiment.

Referring to FIG. 12, in an embodiment, the heating cooking apparatus 100 may further include a user interface 150 that audibly implements user inputs and outputs with a speaker 151 and a microphone 152. The user interface 110 including the display 111 and the input module 112 of the heating cooking apparatus 100 may be called a first user interface, and the user interface 150 including the speaker 151 and the microphone 152 may be called a second user interface.

The controller 120 may include a text-to-speech (TTS) engine to output voice through the speaker 151, and may include a speech-to-text (STT) engine to convert a voice signal input through the microphone 152 to analyzable text. It is also possible to determine a user input corresponding to a voice signal of the user by accessing an external server equipped with the STT engine through the communication module 130.

Referring to FIG. 13, the speaker 151 and the microphone 152 may be arranged in a portion of the plate 101. Alternatively, the speaker 151 and the microphone 152 may be arranged in another position unrelated to the plate 101.

When the operation state of the heater 140 is changed, a voice to receive a confirmation of whether to create a recipe may be output through the speaker 151. For example, when the operation state of the heater 140 is changed for the first time after the heater 140 is turned on, a voice to receive a confirmation of whether to create a recipe may be output.

The user may input a response to whether to create a recipe through the microphone 152. When the user inputs a response indicating that the user wants to create the recipe, the recipe is created according to the aforementioned procedure.

Referring to FIG. 14, when the operation state is changed, especially when the cooking zone Z that has been used is turned off after recipe creation is started, a voice for receiving a confirmation of whether to terminate creation of the recipe may be output through the speaker 151.

The user may input a response to whether to terminate creation of the recipe through the microphone 152. When the user inputs the response indicating that he/she wants to stop creating the recipe, creation of the recipe is terminated, and when the user inputs a response indicating that he/she wants to continue to create the recipe, the recipe creation is continued. In any case, a stage may be created based on the operation information from before the change in operation state of the heater 140.

Referring to FIG. 15, when the operation state is changed after recipe creation is started, a voice for receiving a confirmation of whether to add the operation from before the change to the recipe may be output through the speaker 151.

The user may input a response to whether to add, through the microphone 152. When the user inputs a response indicating that he/she wants to add the operation to the recipe, a stage may be created based on operation information from before the change in heating intensity, and a next stage may be created based on operation information from after the change in heating intensity.

When the user inputs a response indicating that he/she does not want to add the operation to the recipe, the operation information before the change and the operation information after the change may be combined to create stages. For example, the controller 120 may create stages based on a heating time before the change, and a heating time and heating intensity after the change.

As such, when the user inputs and outputs are implemented through voices, the user is able to interact with the heating cooking apparatus 100 for recipe creation even when the user has difficulty in checking the screen displayed on the user interface 110 or manipulating the user interface 110.

It is also possible that the user interface 110 or 150 receives a user input relating to a user action or an ingredient required for each stage belonging to the recipe. When such a user input is received, stages may be created based on not only the operation information of the heater 140 but also the received user input.

A procedure for creating a recipe will now be described by applying a specific example to the aforementioned description.

Figure 16:
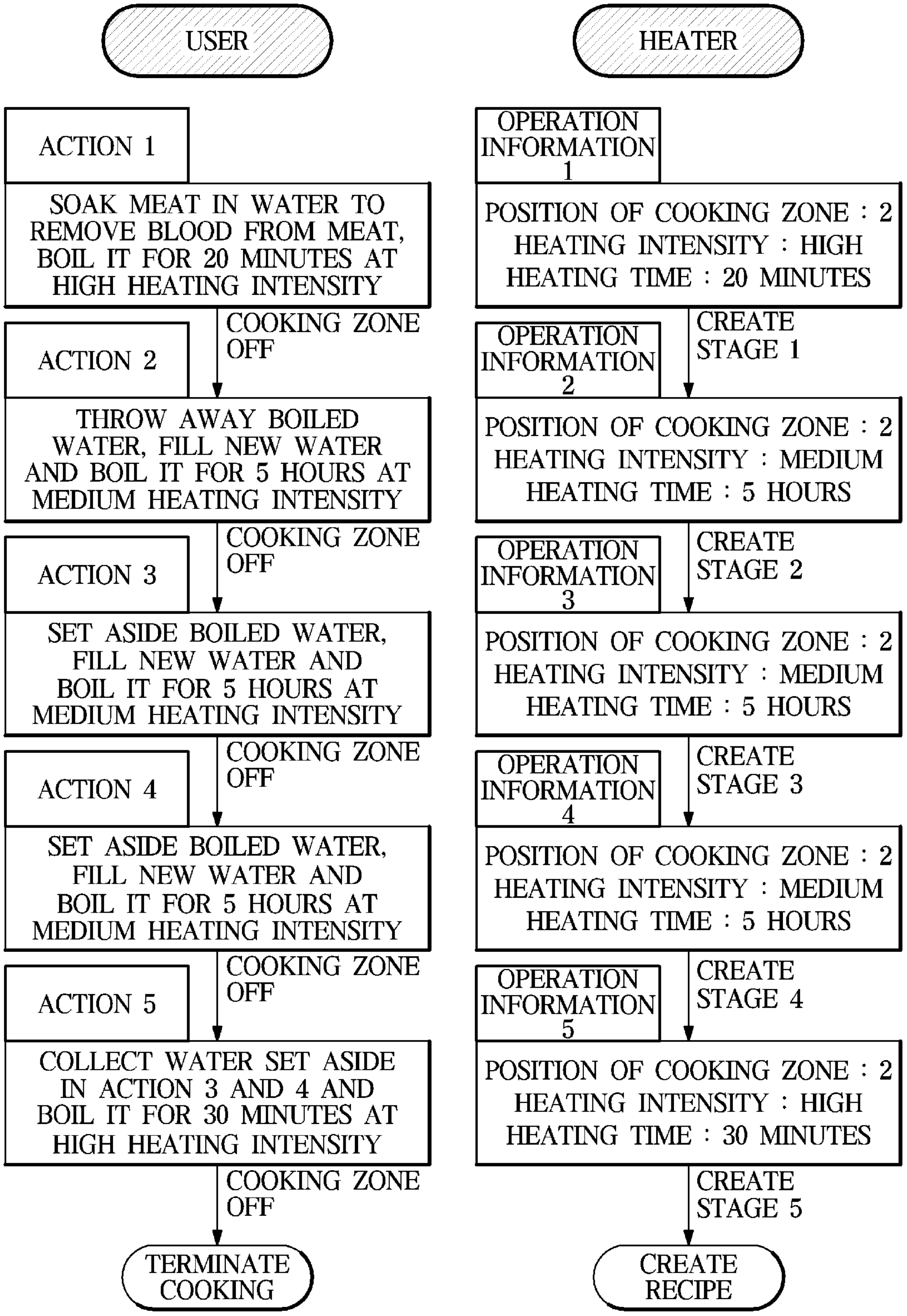
FIGS. 16 and 17 illustrate examples of actions of a user who uses a heating cooking apparatus and stages created based on the actions, according to an embodiment.
Figure 17:
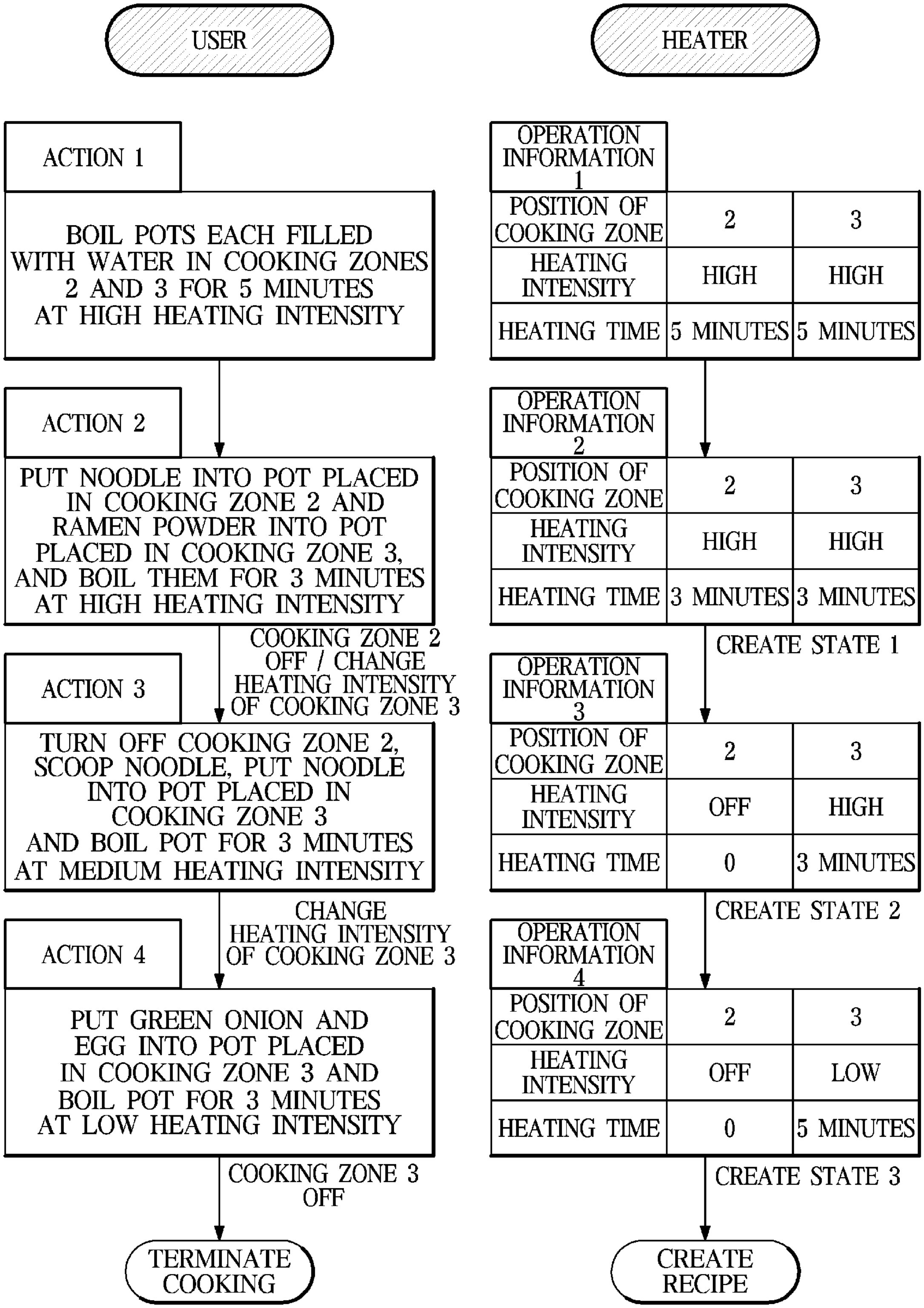

FIGS. 16 and 17 illustrate examples of actions of a user who uses a heating cooking apparatus and stages created based on the actions, according to an embodiment.

The illustration of FIG. 16 is about a case of creating a recipe for beef bone broth. Actions 1, 2, 3, 4 and 5 as illustrated are actions performed by the user.

To remove bleed from meat, a pot in which the meat is soaked in water is placed in the second cooking zone Z2 and boiled at a high heat intensity (action 1). The pot is removed from the second cooking zone Z2 in 20 minutes, or the second cooking zone Z2 is turned off by manipulating the user interface 110 or 150.

The user interface 110 or 150 may display the screen 110*a* for obtaining a confirmation of whether to create a recipe as shown in FIG. 6 as described above or a corresponding voice may be output as shown in FIG. 13. When a user input to create a recipe is received through the user interface 110 or 150, the controller 120 may create a first stage based on operation information of the heater 140 from before the second cooking zone Z2 is turned off, i.e., operation information of the heater 140 corresponding to action 1 (the position of cooking zone is 2, the heating intensity is high, and the heating time is 20 minutes).

Alternatively, as shown in FIGS. 9 and 10 as described above, user inputs to select the start of recipe creation and the position of a cooking zone may be received through the user interface 110 or 150 before the cooking is started. In this case, a new stage may be created without an extra user input each time there is a change in operation state of the heater 140 until the termination of recipe creation is selected.

The water boiled in action 1 is thrown away, and the pot is filled with new water and boiled for 5 hours at a medium heating intensity (action 2).

The pot is removed from the second cooking zone Z2 in 5 hours, or the second cooking zone Z2 is turned off by manipulating the user interface 110.

The user interface 110 or 150 may display the screen 110*b* for obtaining a confirmation of whether to terminate creation of the recipe as shown in FIG. 7 as described above, or a corresponding voice may be output as shown in FIG. 14. When a user input to continue to create the recipe is received through the user interface 110 or 150, the controller 120 may create a second stage based on operation information of the heater 140 from before the second cooking zone Z2 is turned off, i.e., operation information of the heater 140 corresponding to action 2 (the position of cooking zone is 2, the heating intensity is medium, and the heating time is 5 hours).

Alternatively, as described above, in a case that inputs regarding the start and termination of recipe creation are received from the user, the second stage may be created without an extra user input.

The water boiled in action 2 is set aside, and the pot is filled with new water again and boiled for 5 hours at a medium heating intensity (action 3).

The pot is removed from the second cooking zone Z2 in 5 hours, or the second cooking zone Z2 is turned off by manipulating the user interface 110.

The user interface 110 or 150 may display the screen 110*b* for obtaining a confirmation of whether to terminate creation of the recipe as shown in FIG. 7 as described above, or a corresponding voice may be output as shown in FIG. 14. When a user input to continue to create the recipe is received through the user interface 110 or 150, the controller 120 may create a third stage based on operation information of the heater 140 from before the second cooking zone Z2 is turned off, i.e., operation information of the heater 140 corresponding to action 3 (the position of cooking zone is 2, the heating intensity is medium, and the heating time is 5 hours).

Alternatively, as described above, in a case that inputs regarding the start and termination of recipe creation are received from the user, the third stage may be created without an extra user input.

The water boiled in action 3 is set aside, and the pot is filled with new water again and boiled for 5 hours at a medium heating intensity (action 4).

The pot is removed from the second cooking zone Z2 in 5 hours, or the second cooking zone Z2 is turned off by manipulating the user interface 110.

The user interface 110 or 150 may display the screen 110*b* for obtaining a confirmation of whether to terminate creation of the recipe as shown in FIG. 7 as described above, or a corresponding voice may be output as shown in FIG. 14. When a user input to continue to create the recipe is received through the user interface 110 or 150, the controller 120 may create a fourth stage based on operation information of the heater 140 from before the second cooking zone Z2 is turned off, i.e., operation information of the heater 140 corresponding to action 4 (the position of cooking zone is 2, the heating intensity is medium, and the heating time is 5 hours).

Alternatively, as described above, in a case that inputs regarding the start and termination of recipe creation are received from the user, the fourth stage may be created without an extra user input.

The water set aside is collected to be boiled for 30 minutes at a high heating intensity (action 5).

The pot is removed from the second cooking zone Z2 in 30 minutes, or the second cooking zone Z2 is turned off by manipulating the user interface 110.

The user interface 110 or 150 may display the screen 110*b* for obtaining a confirmation of whether to terminate creation of the recipe as shown in FIG. 7 as described above, or a corresponding voice may be output as shown in FIG. 14. When a user input to continue to create the recipe is received through the user interface 110 or 150, the controller 120 may create a fifth stage based on operation information of the heater 140 from before the second cooking zone Z2 is turned off, i.e., operation information of the heater 140 corresponding to action 5 (the position of cooking zone is 2, the heating intensity is high, and the heating time is 30 minutes), and creation of the recipe may be terminated.

As a total of 5 stages are created until the recipe creation is terminated, the controller 120 may create and store the recipe for beef bone broth, which includes first to fifth stages. Alternatively, the communication module 130 may transmit the created recipe to the mobile device 200 or an external server.

The illustration of FIG. 17 is about a case of creating a recipe for ramen. Actions 1, 2, 3 and 4 are actions performed by the user. Description of user inputs to determine creation and termination of a recipe and creation of stages overlaps what is described in the illustration of FIG. 16 as described above, so the description will not be repeated herein.

Pots with water are placed in the second and third cooking zones and boiled for 5 minutes at a high heating intensity (action 1).

Ramen noodle is put into the pot placed in the second cooking zone in 5 minutes, ramen powder is put into the pot placed in the third cooking zone, and then the pots are boiled for 3 minutes at a high heating intensity (action 2).

The second cooking zone is turned off in 3 minutes, the noodles are scooped and put into the pot placed in the third cooking zone and boiled for 3 minutes at a medium heating intensity (action 3).

The operation state of the heater 140 is not changed between action 1 and action 2, but changed between action 2 and action 3 as the second cooking zone is turned off and the heating intensity of the third cooking zone is changed. Accordingly, the controller 120 may create the first stage based on operation information of the heater 140 from before the change in operation state.

Although operation information 1 corresponding to action 1 and operation information 2 corresponding to action 2 are shown separately in FIG. 17 for convenience of explanation, the controller 120 may create a first stage based on operation information in which the operation information 1 and operation information 2 are combined, i.e., operation information of the heater 140 until termination of action 2 after the start of action 1 (the position of the cooking zone is 2, the heating intensity is high, and the heating time is 8 minutes/the position of the cooking zone is 3, the heating intensity is high, and the heating time is 8 minutes).

In the meantime, when the operation state of the heater 140 is not changed as in action 2 but a meaningful user action such as addition of an ingredient is required during the cooking procedure, a required content may be input through the user interface 110 or 150. The controller 120 may create a stage based on the input content.

After the pot placed in the third cooking zone is boiled for 3 minutes in action 3, green onions and eggs are put into the pot and boiled for 3 minutes at a low heating intensity (action 4).

As the heating intensity is changed from medium to low between action 3 and action 4, the operation state of the heater 140 is changed. Accordingly, the controller 120 may create a second stage based on operation information of the heater 140 from before the change in operation state, i.e., operation information of the heater 140 corresponding to action 3 (the position of the cooking zone is 3, the heating intensity is medium and the heating time is 3 minutes).

After the pot in the third cooking zone is boiled for 3 minutes, the cooking may be terminated by turning off the third cooking zone. When a user input to terminate recipe creation is received through the user interface 110 or 150, the controller 120 may create a third stage based on operation information of the heater 140 from before the third cooking zone is turned off, i.e., operation information corresponding to action 4 (the position of cooking zone is 3, the heating intensity is low, and the heating time is 3 minutes), and creation of the recipe may be terminated.

As a total of 3 stages are created until the recipe creation is terminated, the controller 120 may create and store the recipe for ramen, which includes first to third stages. Alternatively, the communication module 130 may transmit the created recipe to the mobile device 200 or an external server.

Figure 18:
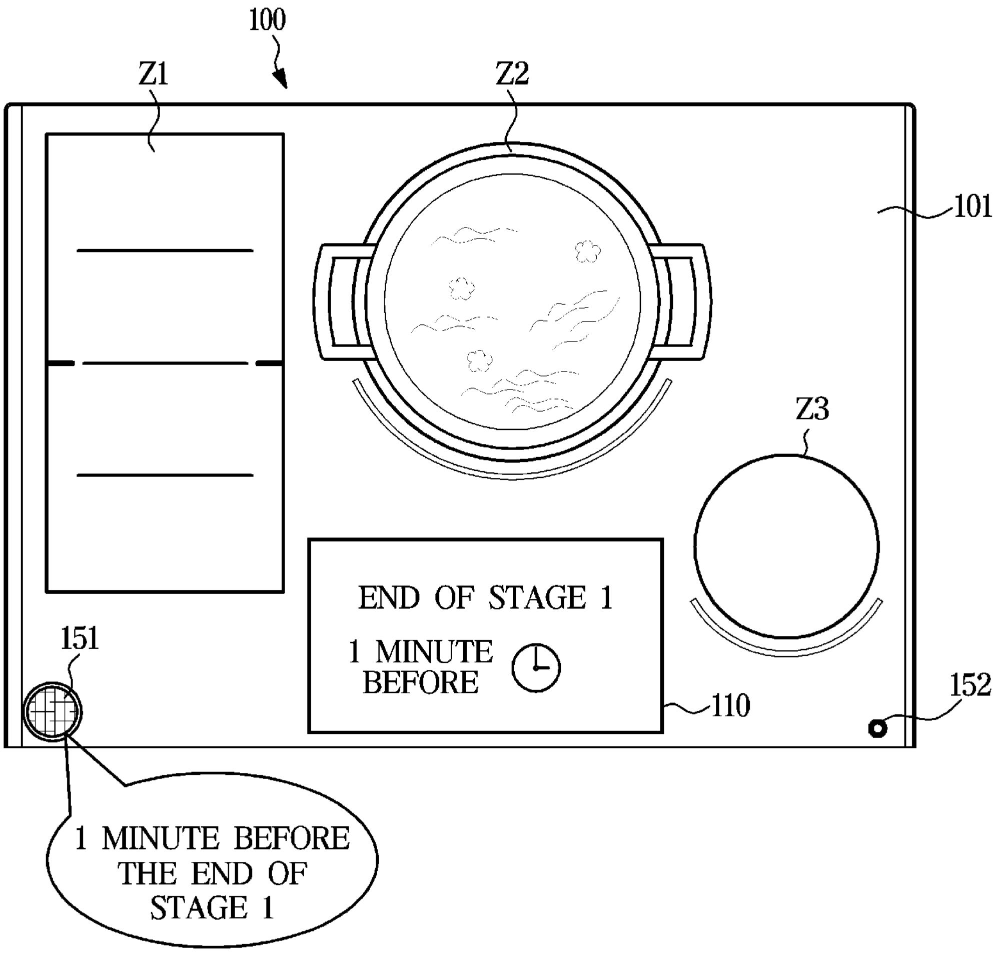
FIGS. 18 and 19 illustrate operations to perform cooking based on a recipe created by a heating cooking apparatus, according to an embodiment.
Figure 19:
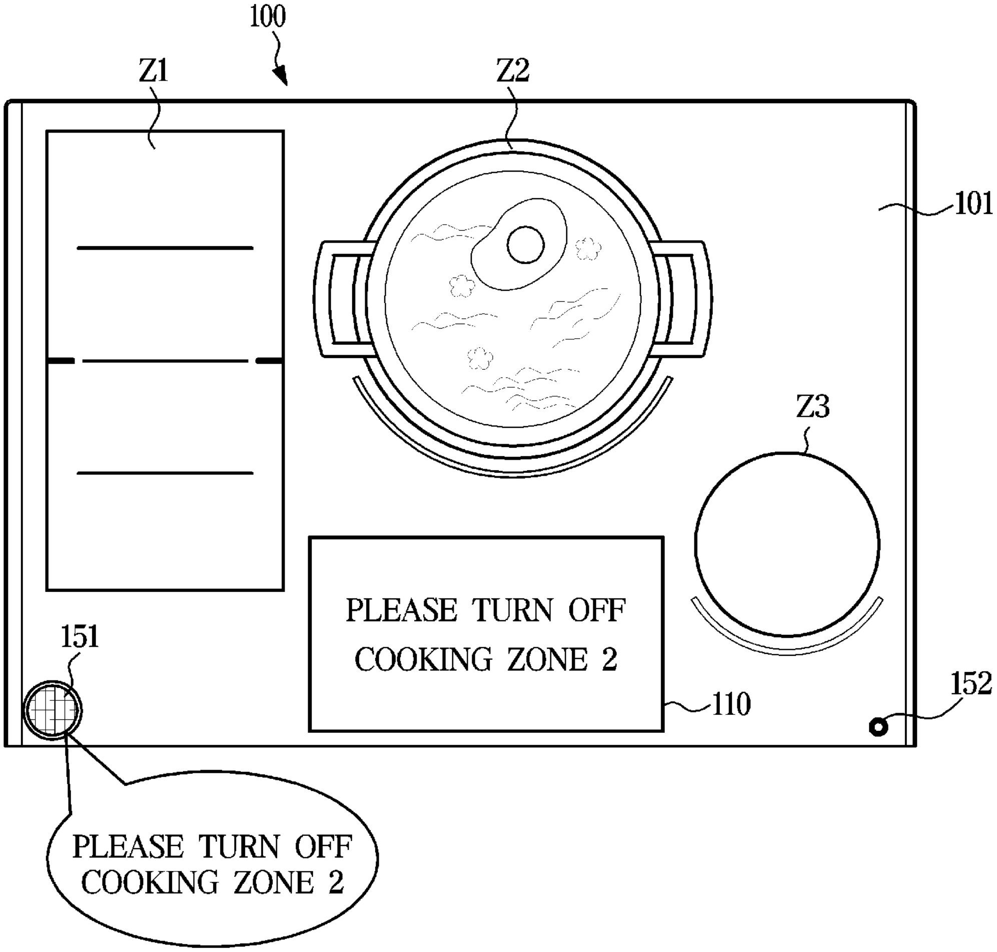

FIGS. 18 and 19 illustrate operations to perform cooking based on a recipe created by a heating cooking apparatus, according to an embodiment.

As described above in connection with FIG. 9, when the show recipe button 110RL displayed on the user interface 110 is selected, the user interface 110 may display a list of already-created recipes, and the user may select a desired recipe from the displayed recipe list. The recipes included in the recipe list may be user-customized recipes created according to the aforementioned procedure, provided by an external server, stored in advance in a manufacturing stage of the heating cooking apparatus 100, or shared from user-customized recipes of other users.

When a recipe is selected and the user places a cooking container in the cooking zone Z2, the controller 120 may recognize the cooking zone Z2 on which the cooking container is placed and automatically control the operation state of the cooking zone Z2 according to the selected recipe or output guide information through the user interface 110 or 150 for the user to control the operation state.

Alternatively, when the position of a cooking zone is meaningful in a cooking procedure, such as when each cooking zone has a different output, information about the position of the cooking zone may be used in creating a stage, as described above. In this case, the user interface 110 or 150 may output a visual or auditory guide to indicate a position of the cooking zone. When the position of the cooking zone to be used is different for each stage, a guide for indicating the position of the cooking zone may be output each time there is a stage change.

The controller 120 may control heating intensity or on/off of the cooking zone Z2 according to operation information of the heater 140 included in the selected recipe, or output guide information for the user to control the heating intensity or on/off of the cooking zone Z2 according to the recipe. Alternatively, even in a case of automatically controlling the heating intensity or on/off, guide information for indicting this to the user may be output.

For example, as shown in FIG. 18, guide information indicating a remaining time until the end of an ongoing stage may be visually output on the user interface 110 or audibly output through the speaker 151 before the stage is changed.

Furthermore, when the corresponding time elapses, guide information for guiding an operation to terminate the ongoing stage (in this example, turn off the cooking zone) may be output through the user interface 110 or the speaker 151 as shown in FIG. 19.

The user may terminate the current stage and move on to the next stage by controlling the heating cooking apparatus 100 according to the output guide information. Alternatively, the controller 120 may terminate the current stage and move on to the next stage by automatically controlling the heater 140 after the guide information as shown in FIG. 18 is output.

A method of controlling a heating cooking apparatus according to an embodiment will now be described. The aforementioned heating cooking apparatus 100 will be used to perform the method of controlling the heating cooking apparatus according to an embodiment. Hence, what are described above with reference to FIGS. 1 to 19 may be equally applied in the following method of controlling the heating cooking apparatus without being specifically mentioned. The same is true of the opposite.

Figure 20:
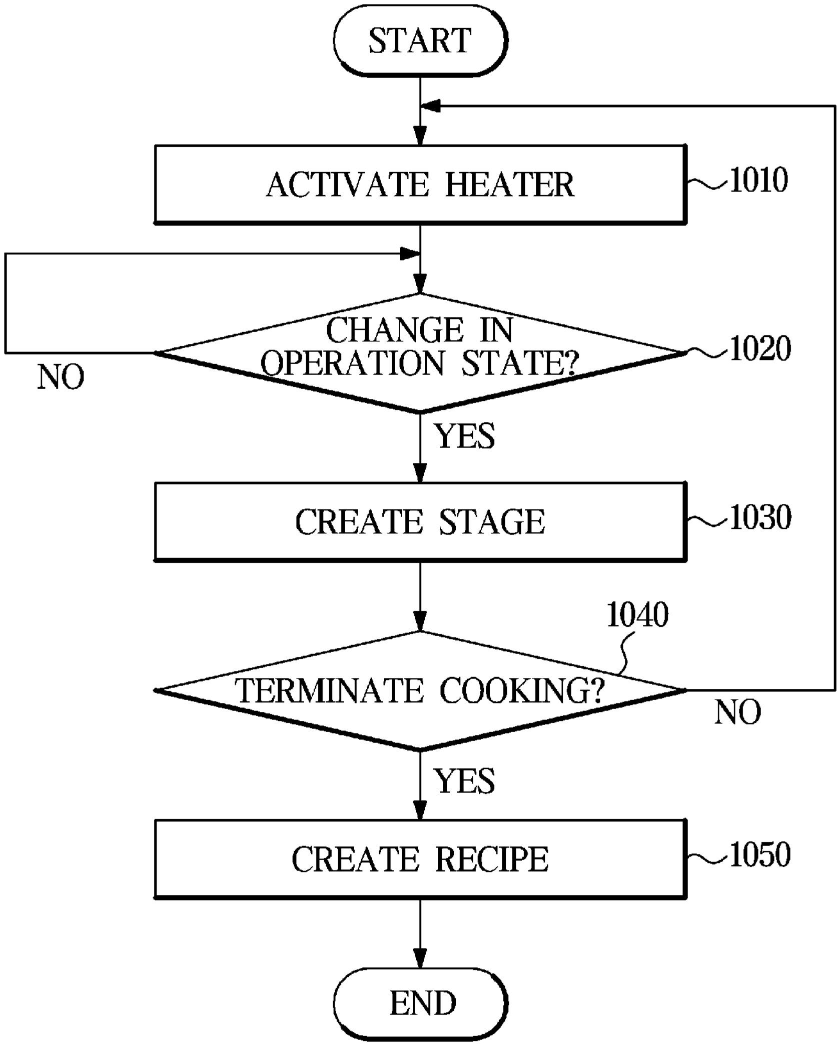
FIG. 20 is a flowchart illustrating a procedure for creating a new recipe in a method of controlling a heating cooking apparatus, according to an embodiment.

FIG. 20 is a flowchart illustrating a procedure for creating a new recipe in a method of controlling a heating cooking apparatus, according to an embodiment.

Referring to FIG. 20, at least one cooking zone arranged on the heating cooking apparatus 100 is turned on, and the corresponding heater 140 is operated, in 1010. The heater 140 being operated may imply the driving circuit 141 applying a current to the driving coil 142 and the driving coil 142 producing an electromagnetic field according to the current applied.

A cooking zone in which a cooking container may be placed may be recognized among the plurality of cooking zones Z to determine operation information, or a user input to select a cooking zone related to creation of a recipe may be received. Hence, the operation information used to create a recipe includes operation information of a coil corresponding to the cooking zone selected from among coils included in the heater 140.

When the operation state of the heater 140 is changed in 1020, a stage may be created based on the operation information of the heater 140 from before the change in operation state in 1030, and when the cooking is not terminated in 1040, the procedure for creating a new stage may be repeated whenever the operation state is changed until the cooking is terminated. For example, it may be determined that cooking is terminated when a user input to terminate the cooking or terminate creation of the recipe is received or when an additional operation does not follow within a set period of time after the cooking zone is turned off.

When the cooking is terminated in 1040, a new recipe including the plurality of stages created until the cooking is terminated is created in 1050.

For example, when the first stage is created based on the operation information from before the change in operation state of the heater 140 and the second stage is created based on the operation information from after the change in operation state of the heater 140, a new recipe including the first stage and the second stage may be created.

As described above, the operation state of the heater 140 may include a heating intensity of the heater 140 and whether the heater 140 is turned on or off, and the operation information of the heater 140 may include information about the heating intensity of the heater 140, the heating time of the heater 140 and a position of the cooking zone used.

The recipe creation may be performed by the controller 120 of the heating cooking apparatus 100. Alternatively, it may be performed by the controller 220 of the mobile device 200 while the heating cooking apparatus 100 and the mobile device 200 are connected by wireless communication. It may also be performed by an external server while the heating cooking apparatus 100 and the external server are connected by wireless communication.

For example, a user input to start recipe creation may be received before the cooking is started, and a user input to terminate the recipe creation may be received after the recipe is created. A new stage may be automatically created without an extra user input whenever the operation state of the heater 140 is changed between the two user inputs. In this case, a new recipe may be conveniently created by minimizing user inputs.

Alternatively, as will be described later, a confirmation of whether to create a recipe, add a stage or terminate the recipe may be obtained from the user each time the operation state is changed. In this case, a taste of the user may be more faithfully reflected.

Figure 21:
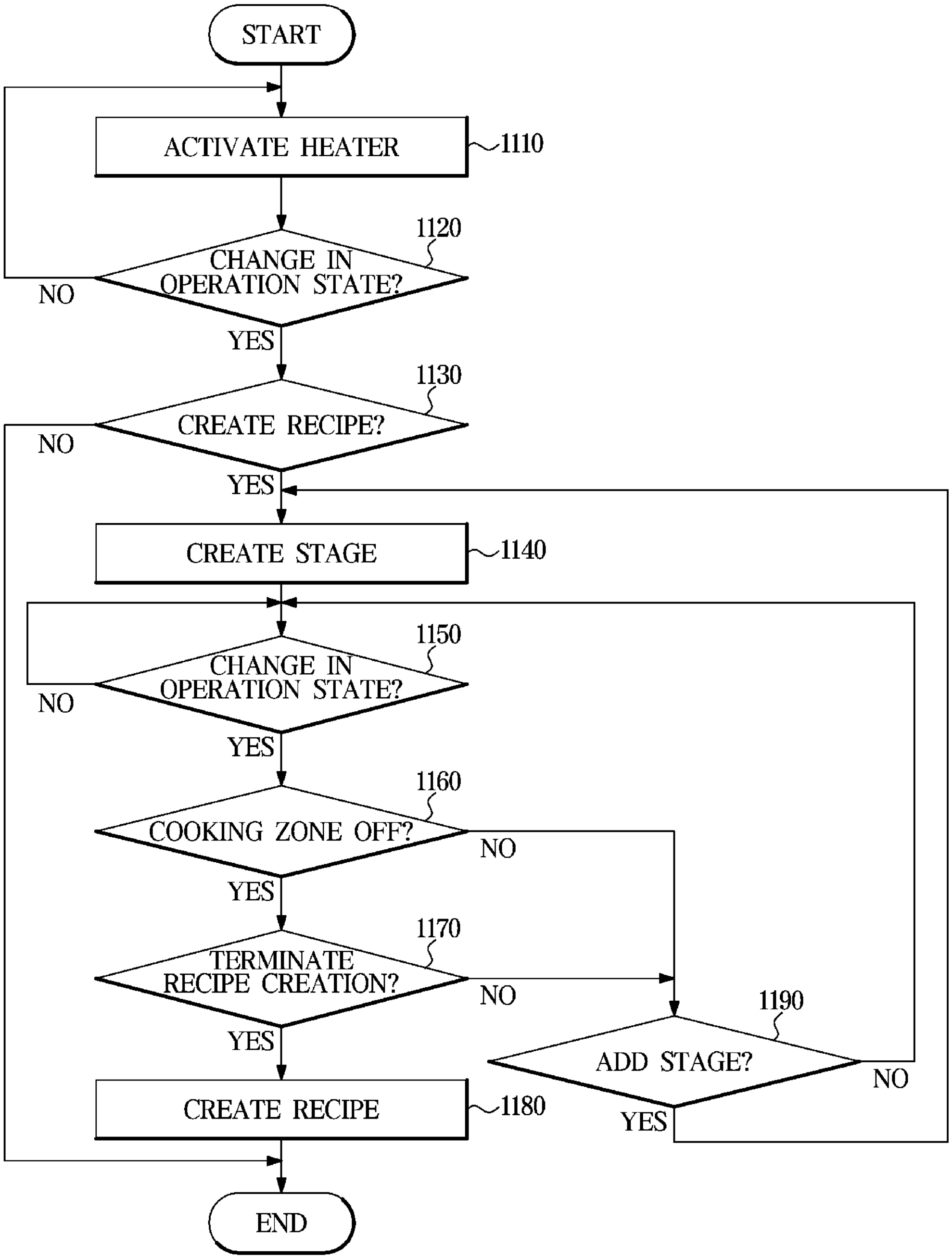
FIG. 21 is a flowchart illustrating a procedure for receiving a user input at every change of operation state to create a recipe in a method of controlling a heating cooking apparatus, according to an embodiment.

FIG. 21 is a flowchart illustrating a procedure for receiving a user input at every change of operation state to create a recipe in a method of controlling a heating cooking apparatus, according to an embodiment.

Referring to FIG. 21, at least one of the plurality of cooking zones Z arranged on the heating cooking apparatus 100 is turned on, and the corresponding heater 140 is operated, in 1110.

When the operation state of the heater 140 is changed in 1120, a confirmation of whether to create the recipe may be obtained through the user interface 110 or 150, and when a user input to create the recipe is received in 1130, a stage is created based on operation information from before a change in operation state in 1140.

When the operation state is changed again in 1150 and the change in operation state corresponds to off of the cooking zone in 1160, whether to terminate creation of the recipe may be asked through the user interface 110 or 150, and when a user input to terminate the recipe creation is received in 1170, a stage may be added based on operation information from before the cooking zone is turned off, a recipe including the stages that have thus far been created may be created in 1180, and then the recipe creation may be terminated. Furthermore, whether to create a stage may be asked based on the operation information from before the cooking zone is turned off, and only when a user input to create a stage is received, the stage may be added.

When a change in operation state corresponds to a change in heating intensity in 1160, whether to add a stage may be asked based on the operation information from before the change through the user interface 110 or 150, and when a user input to add a stage is received in 1190, a stage may be created based on the operation information from before the change in 1140.

When a user input not to add a stage is received in 1190, the operation information before the change in heating intensity is not reflected in the recipe.

Furthermore, when a change in operation state corresponds to turn-off of the cooking zone in 1160 and a user input to terminate the recipe creation is not received in 1170, whether to add a stage may be asked based on the operation information from before the cooking zone is turned off through the user interface 110 or 150, and when a user input to add a stage is received in 1190, a stage may be created based on the operation information from before the change in 1140.

Figure 22:
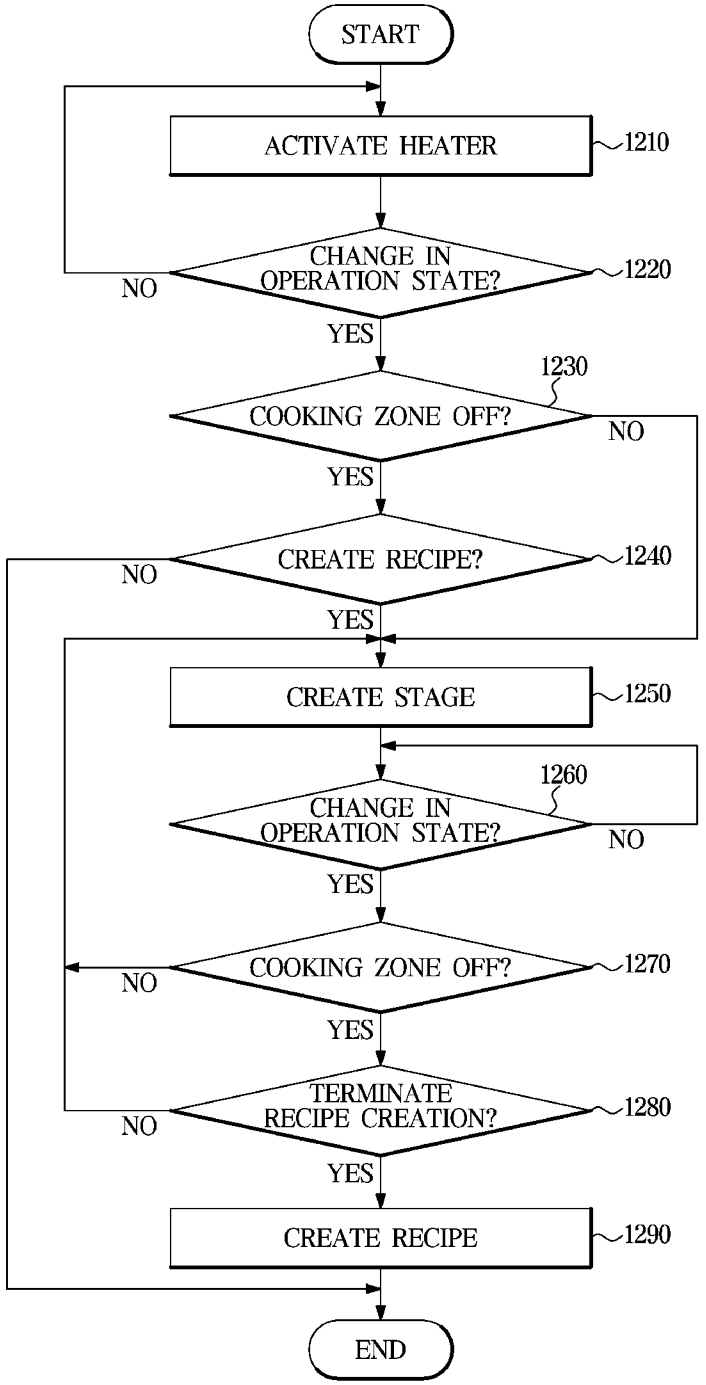
FIG. 22 is a flowchart illustrating automatic creation of a stage without a user input when a heating intensity is changed in a method of controlling a heating cooking apparatus, according to an embodiment.

FIG. 22 is a flowchart illustrating automatic creation of a stage without a user input when a heating intensity is changed in a method of controlling a heating cooking apparatus, according to an embodiment.

When the operation state of the heater 140 is changed after an operation 1210 of the heater 140 in 1220, and the change in operation state corresponds to turn-off of the cooking zone in 1230, a confirmation of whether to create a recipe may be obtained from the user, and when a user input to create the recipe is received in 1240, a stage is created based on operation information from before the change in 1250.

When the change in operation state corresponds to a change in heating intensity in 1230, the controller 120 automatically creates a stage based on the operation information from before the change in 1250 without an extra user input.

In the example, the recipe to be created is assumed to include two or more stages. Hence, the heater is assumed to operate again after the recipe is created, but in another example, it is obvious that the recipe creation may be terminated after only one stage is created.

When another change in operation state is made after the heater is operated again in 1260, and the change in operation state corresponds to a change in heating intensity in 1270, a stage is automatically created in 1250 as similar as described above.

When the change in operation state corresponds to turn-off of the cooking zone in 1270, a confirmation of whether to terminate the recipe creation may be obtained, and when a user input to continue to create the recipe is received in 1280, the heater is operated again after a stage is created based on operation information from before the cooking zone is turned off in 1250.

When the user input to terminate the recipe creation is received in 1280, a stage may be created based on the operation information from before the cooking zone is turned off and a new recipe may be created to include the stages that have thus far been created, in 1290.

The recipe created according to the aforementioned procedure may be stored in at least one of the heating cooking apparatus 100, the mobile device 200 and the external server. Afterward, the user may select one of the created recipes, and once the recipe is selected, the controller 120 may control the operation state of the heater 140 according to the selected recipe.

When there are multiple cooking zones Z, a user input to select one of the multiple cooking zones Z to be operated according to the selected recipe may be received, or a cooking zone Z in which the cooking container is placed may be operated according to the selected recipe.

As described above in connection with FIGS. 18 and 19, the controller 120 may control heating intensity or on/off of the cooking zone Z2 according to operation information of the heater 140 included in the selected recipe, or output guide information for the user to control the heating intensity or on/off of the cooking zone Z2 according to the recipe.

According to the heating cooking apparatus and method for controlling the same that has thus far been described, a user-customized recipe that reflects a taste of the user may be created and provided by creating the recipe based on operation information of the heating cooking apparatus controlled by the user.

Furthermore, even when a cooking zone is turned off while a recipe is created, creation of the recipe may be continued. Accordingly, even when there is a need to lift the cooking container or turn off the cooking zone for a moment during the cooking procedure, recipe creation may not be terminated but may continue so that a cooking process that the user wants may be reflected in the recipe.

Furthermore, involvement of the user for recipe creation may be minimized and concentration of the user on the cooking may be increased by receiving only user inputs to start and terminate recipe creation and automatically creating a stage without an extra user input when there is a change in operation state in-between.

In addition, it is also possible to reflect a taste of the user more faithfully by receiving a confirmation of whether to create a stage from the user each time there is a change in operation state.

The above description illustrates the disclosure. Embodiments of the disclosure are described above, and the disclosure may be used in other various combinations and alterations of the embodiments, and environments. The disclosure may be changed or modified within a range equivalent to what is described above and/or a range of technologies or knowledge of ordinary skill in the art. The aforementioned embodiments of the disclosure are for explaining the best modes to practice the technical idea of the disclosure, and many different modifications thereto may be made for a specific application area and usage. Accordingly, the embodiments of the disclosure are not intended to limit the scope of the disclosure to what are disclosed above. The appended claims are to be interpreted as including other embodiments.

What is claimed is:

1. A heating cooking apparatus comprising:

a plate;

a heater configured to heat at least one cooking container placed in at least one cooking zone of the plate; and a controller configured to create a recipe comprising a plurality of stages based on operation information of the heater, wherein the controller is configured to, based on a change in an operation state of the heater:

create a first stage based on first operation information, among the operation information of the heater, which corresponds to the operation state of the heater before the change of the operation state of the heater, and create a second stage based on second operation information, among the operation information of the heater, which corresponds to the operation state of the heater after the change of the operation state of the heater, and wherein the recipe comprises the first stage and the second stage.

2. The heating cooking apparatus of claim 1, wherein the operation state of the heater comprises a heating intensity of the heater and a power status of the heater, and wherein the operation information of the heater comprises information about the heating intensity of the heater, a heating time of the heater, and the at least one cooking zone.

3. The heating cooking apparatus of claim 1, further comprising a user interface configured to receive a user input regarding whether to create the recipe or whether to add another stage belonging to the recipe based on the change of the operation state of the heater.

4. The heating cooking apparatus of claim 1, further comprising a user interface configured to receive a user input regarding a start of creation of the recipe and a termination of creation of the recipe, wherein the controller is further configured to automatically create the first stage and the second stage based on the operation information of the heater between the start of creation of the recipe and the termination of creation of the recipe.

5. The heating cooking apparatus of claim 1, wherein the at least one cooking zone comprises a plurality of cooking zones, and wherein the heater comprises a plurality of coils corresponding to the plurality of cooking zones, respectively.

6. The heating cooking apparatus of claim 5, further comprising a user interface configured to receive a user input to select a cooking zone of the plurality of cooking zones, the cooking zone being related to the creation of the recipe based on at least two of the plurality of cooking zones being used in creating the recipe.

7. The heating cooking apparatus of claim 6, wherein the controller is further configured to create the recipe based on operation information of a coil in the plurality of coils, the coil corresponding to the selected cooking zone.

8. The heating cooking apparatus of claim 5, further comprising a user interface configured to receive a user input to select the created recipe, wherein the controller is further configured to control the operation state of the heater based on the selected recipe.

9. The heating cooking apparatus of claim 8, wherein the user interface is further configured to receive a user input to select a cooking zone, among the plurality of cooking zones, to be operated based on the selected recipe, and wherein the controller is further configured to control an operation state of a coil corresponding to the selected cooking zone.

10. The heating cooking apparatus of claim 1, further comprising a user interface configured to output a notification of a change between the first stage and the second stage.

11. A method of controlling a heating cooking apparatus comprising a plate and a heater for heating at least one cooking container placed in at least one cooking zone of the plate, the method comprising:

based on a change of an operation state of the heater, creating a first stage based on first operation information of the heater, which corresponds to the operation state of the heater before the change of the operation state of the heater;

creating a second stage based on second operation information of the heater, which corresponds to the operation state of the heater after the change of the operation state of the heater; and creating a recipe comprising the first stage and the second stage.

12. The method of claim 11, wherein the operation state of the heater comprises a heating intensity of the heater and a power status of the heater, and wherein each of the first operation information and the second operation information of the heater comprises information about the heating intensity of the heater, a heating time of the heater, and a cooking zone used among the at least one cooking zone.

13. The method of claim 11, further comprising, based on the change of the operation state of the heater, receiving a user input regarding at least one of whether to start creating the recipe, whether to add another stage to the recipe, and whether to terminate creating the recipe.

14. The method of claim 11, further comprising:

receiving a user input regarding a start of creation of the recipe and a termination of creation of the recipe, and creating the first stage and the second stage automatically based on operation information of the heater between the start of creation of the recipe and the termination of creation of the recipe.

15. The method of claim 11, wherein the at least one cooking zone comprises a plurality of cooking zones, and wherein the heater comprises a plurality of coils corresponding to the plurality of cooking zones, respectively.

16. The method of claim 15, further comprising receiving, by a user interface, a user input selecting a cooking zone of the plurality of cooking zones, wherein the cooking zone is related to creation of the recipe based on at least two of the plurality of cooking zones being used in creating the recipe.

17. The method of claim 16, further comprising creating the recipe based on operation information of a coil of the plurality of coils, the coil corresponding to the selected cooking zone.

18. The method of claim 15, further comprising:

receiving, by a user interface, a user input selecting the created recipe; and controlling the operation state of the heater based on the selected recipe.

19. The method of claim 18, further comprising:

receiving, by the user interface, a user input selecting a cooking zone, among the plurality of cooking zones, to be operated based on the selected recipe; and controlling an operation state of a coil corresponding to the selected cooking zone.

20. The method of claim 11, further comprising outputting, by a user interface, a notification of a change between the first stage and the second stage.

* * * * *